United States Patent
Beppu et al.

(10) Patent No.: US 10,384,888 B2
(45) Date of Patent: Aug. 20, 2019

(54) TEMPERATURE MANAGEMENT APPARATUS, TRANSFER APPARATUS, AND TRANSFER BASE

(71) Applicant: Azbil Corporation, Tokyo (JP)

(72) Inventors: Hisashi Beppu, Tokyo (JP); Yoichi Okawa, Tokyo (JP)

(73) Assignee: Azbil Corporation, Tokyo (JP)

( * ) Notice: Subject to any disclaimer, the term of this patent is extended or adjusted under 35 U.S.C. 154(b) by 66 days.

(21) Appl. No.: 15/497,742

(22) Filed: Apr. 26, 2017

(65) Prior Publication Data

US 2017/0225912 A1   Aug. 10, 2017

Related U.S. Application Data

(63) Continuation of application No. PCT/JP2015/078576, filed on Oct. 8, 2015.

(30) Foreign Application Priority Data

Oct. 30, 2014   (JP) .................................. 2014-221217

(51) Int. Cl.
  *B65G 54/02* (2006.01)
  *F26B 5/06* (2006.01)
  (Continued)

(52) U.S. Cl.
  CPC ............. *B65G 54/02* (2013.01); *B65G 47/82* (2013.01); *B65G 65/00* (2013.01); *F26B 5/06* (2013.01); *F26B 25/00* (2013.01); *B65G 47/642* (2013.01)

(58) Field of Classification Search
  CPC ........ B65G 54/02; B65G 47/52; B65G 47/53; B65G 47/641; B65G 47/642; B65G 47/82;
  (Continued)

(56) References Cited

U.S. PATENT DOCUMENTS 5,377,816 A * 1/1995 Deligi ............... H01L 21/67709
                                                    198/619
5,649,800 A   7/1997 Hemmersbach et al.
(Continued)

FOREIGN PATENT DOCUMENTS

CN   202973764 U   6/2013
DE   19527005 A1   3/1996
(Continued)

OTHER PUBLICATIONS

PCT International Search Report received for PCT Patent Application No. PCT/JP2015/078576 dated Dec. 1, 2015, 5 pages (2 pages of English Translation and 3 pages of PCT search report).
(Continued)

*Primary Examiner* — Glenn F Myers
(74) *Attorney, Agent, or Firm* — Amster, Rothstein & Ebenstein LLP

(57) ABSTRACT

A temperature management apparatus is provided with: a temperature management furnace having a space in which an article is disposed and temperature is managed; bar-like members containing a magnetic material; facing members, each of which faces a part of the side surface of each of the bar-like members and contains a magnetic material; drive apparatuses, which rotate the bar-like members about their center axes and change the relative positions of the bar-like members and the facing members; and a contact member, which moves in the temperature management furnace in association with changes of the relative positions of the bar-like members and the facing members, and which moves the article by being in contact with the article. The drive apparatuses are disposed outside of the space in which temperature is managed.

20 Claims, 24 Drawing Sheets

(51) Int. Cl.
*F26B 25/00* (2006.01)
*B65G 47/82* (2006.01)
*B65G 65/00* (2006.01)
*B65G 47/64* (2006.01)

(58) Field of Classification Search
CPC .......... B65G 1/0435; F26B 5/06; F26B 5/044;
F26B 25/00; F26B 25/02; F26B 25/003;
F26B 25/004; F26B 15/00; F26B 15/14;
H02K 41/00; H02K 41/02; H02K 15/02;
H02K 7/06; H01F 7/0242; H01F 7/0247
See application file for complete search history.

(56) References Cited

U.S. PATENT DOCUMENTS

| | | | |
|---|---|---|---|
| 5,687,614 A | 11/1997 | Hashimoto | |
| 5,872,407 A * | 2/1999 | Kitaoka | H02K 29/06 310/12.14 |
| 5,906,262 A * | 5/1999 | Miki | B65G 54/02 198/341.02 |
| 5,913,401 A | 6/1999 | Tamura et al. | |
| 6,592,365 B1 * | 7/2003 | Johns | F27D 99/0073 277/358 |
| 8,235,640 B2 | 8/2012 | Balboni et al. | |
| 9,242,804 B2 * | 1/2016 | Trebbi | F26B 5/06 |
| 9,316,438 B2 * | 4/2016 | Van Veen | B65G 47/82 |
| 2004/0100152 A1 * | 5/2004 | Finkbeiner | H02K 15/0457 310/12.24 |
| 2007/0075592 A1 * | 4/2007 | Ohno | H02K 41/03 310/12.22 |
| 2013/0185952 A1 | 7/2013 | Christ | |
| 2015/0246777 A1 | 9/2015 | Trebbi et al. | |

FOREIGN PATENT DOCUMENTS

| | | |
|---|---|---|
| JP | S63-235214 A | 9/1988 |
| JP | H11-166607 A | 6/1999 |
| JP | H11-278663 A | 10/1999 |
| JP | 2000-320963 A | 11/2000 |
| JP | 2001-215082 A | 8/2001 |
| JP | 2002-089649 A | 3/2002 |
| JP | 2008-019019 A | 1/2008 |
| JP | 2008-501597 A | 1/2008 |
| JP | 2012-211599 A | 11/2012 |
| WO | 93/23319 A1 | 11/1993 |
| WO | 2005/121671 A1 | 12/2005 |
| WO | 2013/136161 A1 | 9/2013 |

OTHER PUBLICATIONS

PCT Written Opinion dated Dec. 1, 2015 for PCT International Patent Application No. PCT/JP2015/078576, 3 pages.

European Patent Office, "Extended European Search Report," issued in European Patent Application No. 15 854 718.2 which is a European Counterpart of U.S. Appl. No. 15/497,742, dated Sep. 11, 2018, 11 pages.

The State Intellectual Property Office of People's Republic of China, "The First Office Action", issued in Chinese Patent Application No. 201580058709.X, which is a CN counterpart of U.S. Appl. No. 15/497,742, dated Dec. 3, 2018, 27 pages (15 pages of English Translation of Office Action and 12 pages of Original Office Action).

* cited by examiner

TEMPERATURE MANAGEMENT APPARATUS, TRANSFER APPARATUS, AND TRANSFER BASE

CROSS-REFERENCE TO RELATED APPLICATIONS

The present application claims the benefit of and priority to Japanese Patent Application No. 2014-221217, filed on Oct. 30, 2014 and International Patent Application No. PCT/JP2015/078576, filed on Oct. 8, 2015, the entire contents of which are incorporated by reference herein.

TECHNICAL FIELD

The present invention relates to a transfer technique, and more particularly to a temperature management apparatus, a transfer apparatus, and a transfer base.

BACKGROUND ART

PTL 1 discloses a transfer apparatus in which a slider for transferring an article into a freeze drying furnace is equipped with a driving force transmitting mechanism, such as a toothed wheel or belt. A track that meshes with the teeth of the wheel or the belt of the slider is provided on a transfer plane of the freeze drying furnace, and the slider is allowed to travel on the track in the freeze drying furnace. PTL 2 discloses a transfer apparatus having a slider that is driven by a linear motor for transferring an article inside and outside a furnace. PTL 3 discloses a transfer apparatus that is provided with a rod for conveying an article inside and outside a furnace, which is connected to a tip of a belt-like actuator.

CITATION LIST

Patent Literature

PTL 1: International Publication No. 2013/136161
PTL 2: US Patent Application Publication No. 2013/0185952
PTL 3: International Publication No. 2005/121671

SUMMARY

For example, in a process of processing the article by giving a certain temperature profile to a large number of articles contained in a furnace, such as the freeze drying furnace, unless each article is processed so that a temperature profile of each article is kept uniform, the quality of the articles becomes uneven. In addition, it is difficult to grasp that the quality of articles is uneven by sampling, inspection, or the like.

For that reason, it is desirable that a temperature distribution in the furnace under a temperature management becomes uniform in a furnace, whose temperature is managed to give a predetermined temperature treatment to the articles, without being limited to the freeze drying process. However, the present inventors have ascertained a fact that heat generation from a device for carrying the articles into the furnace makes the temperature distribution of the furnace and the article uneven, which causes deterioration in quality, through a diligent research. In addition, in the case where the articles to be carried into the furnace with a managed temperature are pharmaceuticals, foods, beverages, precision parts, and so on, it is desirable that the temperature-managed furnace is clean. For that reason, it is desirable that the device that carries the articles into the temperature-managed furnace and carries out the articles from the temperature-managed furnace has a low heat generation property and a low dust generation property.

However, the slider that enters the freeze drying furnace disclosed in PTL 1 generates dust due to a friction between meshing portions when the toothed wheel, belt, or the like, travels on the track. In addition, a motor that generates a driving force, a battery that serves as a power source for the motor, and so on are internally provided in the slider. For that reason, the slider disclosed in PTL 1 may generate heat and dust in the furnace.

In the slider driven by the linear motor disclosed in PTL 2, a coil is disposed in a mover within the slider in the case of a moving coil system and in a stator installed in the furnace in the case of a moving magnet system. In generating the driving force for the slider, whichever system is used, the coil in which a current flows in the furnace generates heat.

Furthermore, in the transfer apparatus disclosed in PTL 3, a guide for guiding the belt across the furnace is provided, and dust may be generated by sliding between the guide and the belt. Further, the guide has a narrow groove, to thereby make it difficult to clean the guide and also to remove foreign matter from the guide.

Accordingly, it is an object of the present invention to provide a temperature management apparatus, a transfer apparatus, and a transfer base with a low heat generation property and a low dust generation property.

[1] A temperature management apparatus, comprising: (a) a temperature management furnace having a space in which an article is placed and whose temperature is managed; (b) a rod-shaped member that includes a magnetic material; (c) an opposite member that is opposed to a part of a side surface of the rod-shaped member and includes a magnetic material; (d) a driving device that rotates the rod-shaped member or the opposite member around a central axis of the rod-shaped member to change a relative position of the rod-shaped member and the opposite member; and (e) a contact member that moves within the temperature management furnace in association with a change in a relative position between the rod-shaped member and the opposite member and that moves the article by contact with the article, in which (f) the driving device is disposed outside of the space whose temperature is managed.

[2] The temperature management apparatus according to the item [1], in which when the driving device rotates the rod-shaped member, the opposite member moves along the central axis of the rod-shaped member and the contact member fixed to the opposite member moves.

[3] The temperature management apparatus according to the item [2], in which the rod-shaped member, the opposite member, and the contact member are disposed inside of the space whose temperature is managed.

[4] The temperature management apparatus according to the item [3], further comprising a mandrel that penetrates a side wall of the temperature management furnace and connects the rod-shaped member to the driving device.

[5] The temperature management apparatus according to the item [4], further comprising a sealing member that is disposed in a hole in the side wall of the temperature management furnace through which the mandrel penetrates.

[6] The temperature management apparatus according to the item [1], in which when the driving device rotates the opposite member, the rod-shaped member moves in a central axis direction, and the contact member fixed to the rod-shaped member moves.

[7] The temperature management apparatus according to the item [6], in which the contact member is disposed inside of the space whose temperature is managed, and the opposite member is disposed outside of the space whose temperature is managed.

[8] The temperature management apparatus according to the item [7], in which the rod-shaped member penetrates through the side wall of the temperature management furnace.

[9] The temperature management apparatus according to the item [8], further including a sealing member disposed in a hole of the side wall of the temperature management furnace through which the rod-shaped member penetrates.

[10] The temperature management apparatus according to any one of the items [1] to [9], in which the temperature management furnace is a freeze drying furnace.

[11] The temperature management apparatus according to any one of the items [1] to [10], in which the article includes a medicine.

[12] A transfer apparatus, comprising: (a) a rod-shaped member that comprises a magnetic material; (b) an opposite member that is opposed to a part of a side surface of the rod-shaped member and comprises a magnetic material; (c) a driving device that rotates the rod-shaped member or the opposite member around a central axis of the rod-shaped member to change a relative position of the rod-shaped member and the opposite member; and (d) a contact member that moves in association with a change in a relative position between the rod-shaped member and the opposite member and that moves an article to be transferred inside and outside a temperature management furnace by contact with the article.

[13] The transfer apparatus according to the item [12], in which the temperature management furnace comprises a freeze drying furnace.

[14] The transfer apparatus according to the item [12] or [13], in which the article comprises a medicine.

[15] The transfer apparatus according to any one of the items [12] to [14], in which when the driving device rotates the rod-shaped member, the opposite member moves along the central axis of the rod-shaped member and the contact member fixed to the opposite member moves.

[16] The transfer apparatus according to any one of the items [12] to [14], in which when the driving device rotates the opposite member, the rod-shaped member moves in a central axis direction, and the contact member fixed to the rod-shaped member moves.

[17] A transfer base comprising: (a) a base member; (b) a table that is located on the base member; (c) a table movement rod-shaped member that comprises a magnetic material; (d) a table movement opposite member that is opposed to a part of a side surface of the table movement rod-shaped member and comprises a magnetic material; (e) a table driving device that rotates the table movement rod-shaped member or the table movement opposite member around a central axis of the table movement rod-shaped member and changes a relative position between the table movement rod-shaped member and the table movement opposite member to move the table; (f) a contact member for moving the article by contact with the article placed on the table; (g) a contact member movement rod-shaped member that comprises a magnetic material; (h) a contact member movement opposite member that is opposed to a part of a side surface of the contact member movement rod-shaped member and comprises a magnetic material; and (i) a contact member driving device that rotates the contact member movement rod-shaped member or the contact member movement opposite member around the central axis of the contact member movement rod-shaped member and changes a relative position between the contact member movement rod-shaped member and the contact member movement opposite member to move the contact member.

[18] The transfer base according to the item [17], in which when the table driving device rotates the table movement rod-shaped member, the table movement opposite member moves along the central axis of the table movement rod-shaped member and the table fixed to the table movement opposite member moves.

[19] The transfer base according to the item [17], in which when the table driving device rotates the table movement opposite member, the table movement rod-shaped member moves in a direction of the central axis and the table fixed to the table movement rod-shaped member moves.

[20] The transfer base according to any one of the items [17] to [19], in which when the contact member driving device rotates the contact member movement rod-shaped member, the contact member movement opposite member moves along a central axis of the contact member movement rod-shaped member and the contact member fixed to the contact member movement opposite member moves.

[21] The transfer base according to any one of the items [17] to [19], in which when the contact member driving device rotates the contact member movement opposite member, the contact member movement rod-shaped member moves along a direction of the central axis and the contact member fixed to the contact member movement rod-shaped member moves.

[22] The transfer base according to any one of the items [17] to [21], in which the article comprises a medicine.

[23] The transfer base according to any one of the items [17] to [22], in which the transfer base is configured to transfer the article into a temperature management furnace.

[24] The transfer base according to the item [23], in which the temperature management furnace comprises a freeze drying furnace.

[25] The transfer base according to any one of the items [17] to [24], further comprising a wheel that is disposed on the base member.

According to the present invention, a temperature management apparatus, a transfer apparatus, and a transfer base with a low heat generation property and a low dust generation property can be provided.

DETAILED DESCRIPTION

Hereinafter, embodiments of the present invention will be described. In the description of the drawings given below, the same or similar parts are denoted by the same or similar reference signs. However, the drawings are schematic. Therefore, specific dimensions and so on should be determined by referring to the following description. Among the drawings, portions which are different from each other in dimension and ratio may be included.

First Embodiment

Figure 1:
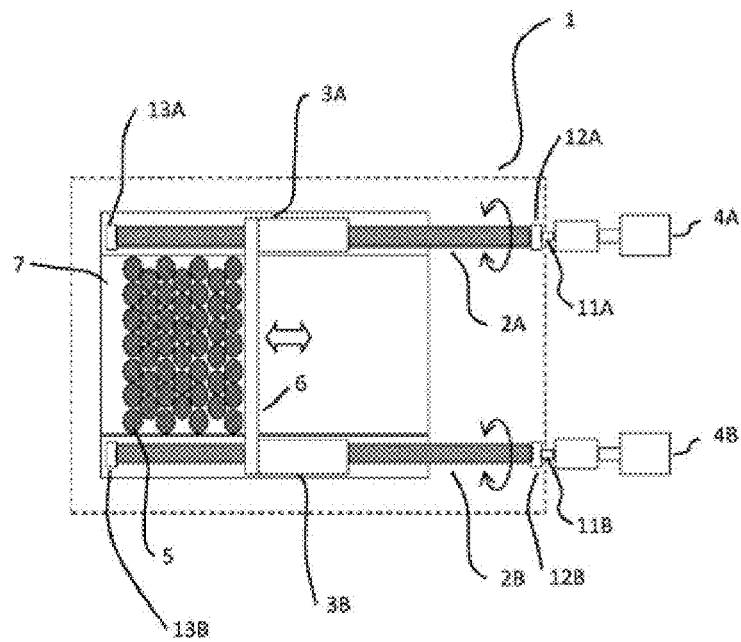
FIG. 1 is a schematic diagram of a temperature management apparatus according to a first embodiment of the present invention.

As illustrated in FIG. 1, a temperature management apparatus according to a first embodiment of the present invention includes a temperature management furnace 1 having a space in which articles 5 are placed and whose temperature is managed; rod-shaped members 2A and 2B each comprising a magnetic material; opposite members 3A and 3B that are opposed to parts of side surfaces of the rod-shaped members 2A and 2B, respectively, and each comprising a magnetic material; a driving device 4A that rotates the rod-shaped member 2A around a central axis thereof to change a relative position of the rod-shaped member 2A and the opposite member 3A; a driving device 4B that rotates the rod-shaped member 2B around a central axis thereof to change a relative position of the rod-shaped member 2B and the opposite member 3B; and a contact member 6 that moves within the temperature management furnace 1 in association with a change in a relative position between the rod-shaped members 2A, 2B and the opposite members 3A, 3B and that moves the articles 5 by contact with the articles 5, in which the driving devices 4A and 4B are disposed outside of the space whose temperature is managed.

The temperature management furnace 1 is, for example, a freeze drying furnace. For example, a shelf board 7 is disposed in the temperature management furnace 1 and the articles 5, including an object to be freeze dried, are disposed on the shelf board 7. The articles 5 are, for example, vials into which a medicine has been injected.

Figure 2:
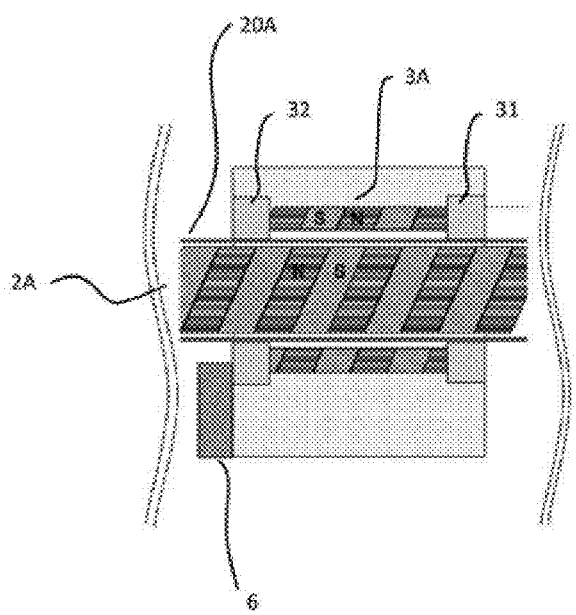
FIG. 2 is a schematic diagram of a rod-shaped member and an opposite member according to the first embodiment of the present invention.

The cylindrical rod-shaped member 2A is held in the temperature management furnace 1 by bearings 12A and 13A. As illustrated in FIG. 2, the rod-shaped member 2A is a magnetic screw including a hard magnetic material, and S pole magnetized zones and N pole magnetized zones are alternately provided on an outer peripheral surface of the rod-shaped member 2A in a spiral shape. The rod-shaped member 2A may be inserted into a nonmagnetic thin-walled pipe 20A. The pipe 20A is made of, for example, stainless steel. The rod-shaped member 2A and the pipe 20A are integrated with each other, and when the rod-shaped member 2A rotates, the pipe 20A also rotates around the central axis of the rod-shaped member 2A.

The opposite member 3A held in the temperature management furnace 1 is a magnetic nut including a hard magnetic material and is provided with a hole having an inner circumference larger than an outer circumference of the rod-shaped member 2A. The rod-shaped member 2A penetrates through the hole of the nut-shaped opposite member 3A. S pole magnetized zones and N pole magnetized zones are alternately provided in a spiral shape on an inner peripheral surface of the hole of the opposite member 3A. The pitch of the magnetized zones in the opposite member 3A is substantially the same as the pitch of the magnetized zones in the rod-shaped member 2A. Guide rings 31 and 32 such as bushes may be disposed on an inner peripheral surface of the opposite member 3A. The inner circumferences of the respective guide rings 31 and 32 are smaller than the inner circumference of the opposite member 3A and come in contact with the outer peripheral surface of the pipe 20A. As a result, a constant interval is kept between the magnetized zones of the rod-shaped member 2A and the magnetized zones of the opposite member 3A. The guide rings 31 and 32 are made of a material having a small friction coefficient, such as fluororesin.

As illustrated in FIG. 1, the cylindrical rod-shaped member 2B is held in parallel with the rod-shaped member 2A by the aid of the bearings 12B and 13B in the temperature management furnace 1. A configuration of the rod-shaped member 2B is the same as that of the rod-shaped member 2A. A configuration of the opposite member 3B held in the temperature management furnace 1 is the same as that of the opposite member 3A. The contact member 6 held in the temperature management furnace 1 is a plate member and is fixed between the opposite member 3A and the opposite member 3B so as to be substantially perpendicular to a surface of the shelf board 7.

The driving devices 4A and 4B include, for example, rotating motors, and are disposed outside of a space whose temperature is managed by the temperature management furnace 1. The driving devices 4A and 4B may be disposed outside of a housing of the temperature management furnace 1 or may be disposed inside of the housing of the temperature management furnace 1 and outside of the space whose temperature is managed. The driving devices 4A and 4B may be covered with a shield, or the like, which prevents diffusion of possible dust, or the like. The driving device 4A and the rod-shaped member 2A are connected to each other through, for example, a mandrel 11A that penetrates through a side wall of the temperature management furnace 1. The arrangement of the driving device 4A is fixed, and the rod-shaped member 2A connected to the driving device 4A is not allowed to move in the direction of the central axis thereof. The driving device 4B and the rod-shaped member 2B are connected to each other through, for example, a mandrel 11B that penetrates through the side wall of the temperature management furnace 1. The arrangement of the driving device 4B is fixed and the rod-shaped member 2B connected to the driving device 4B is not allowed to move in the direction of the central axis thereof. The respective holes of the side wall of the temperature management furnace 1 through which the mandrels 11A and 11B penetrate are provided with sealing members, such as oil seals.

The driving devices 4A and 4B synchronously rotate the rod-shaped members 2A and 2B. When the driving device 4A rotates the rod-shaped member 2A, a magnetic force acts between the magnetized zones of the rod-shaped member 2A and the magnetized zones of the opposite member 3A. The opposite member 3A is fixed to the contact member 6 and the opposite member 3B and is not allowed to rotate. For that reason, when the rod-shaped member 2A is rotated, the opposite member 3A moves along the direction of the central axis of the rod-shaped member 2A. When the driving device 4B rotates the rod-shaped member 2B, a magnetic force acts between the magnetized zones of the rod-shaped member 2B and the magnetized zones of the opposite member 3B, and the opposite member 3B moves along the central axis of the rod-shaped member 2B. The contact member 6 fixed between the opposite members 3A and 3B also moves along the central axes of the rod-shaped members 2A and 2B on the shelf board 7 along with the movement of the opposite members 3A and 3B. The articles 5 placed on the shelf board 7 are pushed by the contact member 6 and move on the shelf board 7. Furthermore, the articles 5 may be pushed from a door of the temperature management furnace 1 to the outside of the temperature management furnace 1.

In the temperature management apparatus according to the first embodiment described above, the driving force is transmitted between the rod-shaped members 2A, 2B and the opposite members 3A, 3B in a non-contact manner by the aid of the magnetic force. Therefore, when the driving force is transmitted between the rod-shaped members 2A, 2B and the opposite members 3A, 3B, heat and dust are less likely to be generated. For that reason, even if the rod-shaped members 2A, 2B and the opposite members 3A, 3B are disposed in the space whose temperature management is performed by the temperature management furnace 1, an influence of heat generation in the space whose temperature is managed is suppressed, and the space whose temperature is managed can be kept clean.

Furthermore, since the driving devices 4A and 4B are disposed outside of the space whose temperature management is performed by the temperature management furnace 1, even if dust is generated in the driving devices 4A and 4B, the dust is less likely to enter the space whose temperature management is performed by the temperature management furnace 1. If the driving device is disposed inside of the temperature management furnace, a temperature distribution may be made uneven inside of the temperature management furnace, such as a freeze drying furnace, due to the heated driving device. In that case, the quality of multiple articles placed inside of the temperature management furnace may be made uneven. On the contrary, in the temperature management apparatus according to the first embodiment, because the driving devices 4A and 4B are disposed outside of the space whose temperature management is performed by the temperature management furnace 1, temperature unevenness is less likely to occur inside of the temperature management furnace 1.

Still further, in the temperature management apparatus according to the first embodiment, when the contact member 6 is moved, the rod-shaped members 2A and 2B do not go out to the outside of the temperature management furnace 1. For that reason, no foreign matter is drawn into the temperature management furnace 1 by the rod-shaped members 2A and 2B from the outside of the temperature management furnace 1. Therefore, the temperature management apparatus according to the first embodiment can keep the inside of the temperature management furnace 1 clean, and suppress temperature unevenness inside of the temperature management furnace 1.

Modification of First Embodiment

Figure 3:
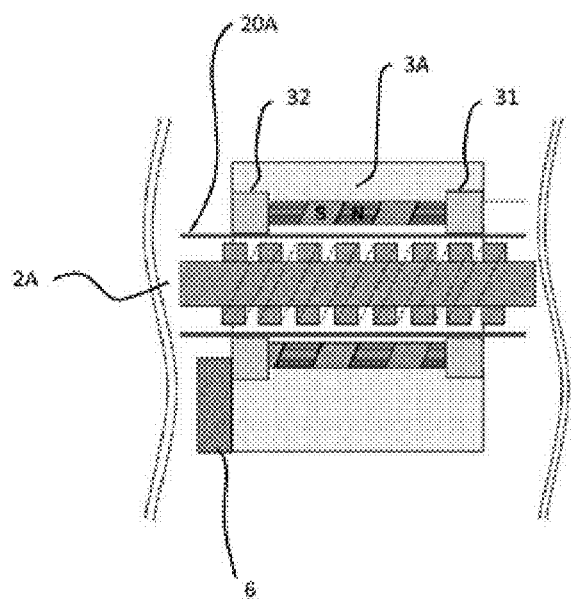
FIG. 3 is a schematic diagram of a rod-shaped member and an opposite member according to a modification of the first embodiment of the present invention.

The configurations of the rod-shaped member 2A and the opposite member 3A are not limited to the example illustrated in FIG. 2. For example, as illustrated in FIG. 3, the rod-shaped member 2A may be made of a threaded soft magnetic material. The configuration of the opposite member 3A is the same as that of FIG. 2. A pitch of the threads of the rod-shaped member 2A illustrated in FIG. 3 is substantially the same as the pitch of the magnetized zones of the opposite member 3A. The threaded rod-shaped member 2A may be inserted into the nonmagnetic thin-walled pipe 20A. This makes it possible to prevent foreign matters from adhering to the threaded groove of the rod-shaped member 2A. When the rod-shaped member 2A is rotated, a magnetic force acts between the threads of the rod-shaped member 2A and the magnetized zones of the opposite member 3A, and the opposite member 3A moves.

Figure 4:
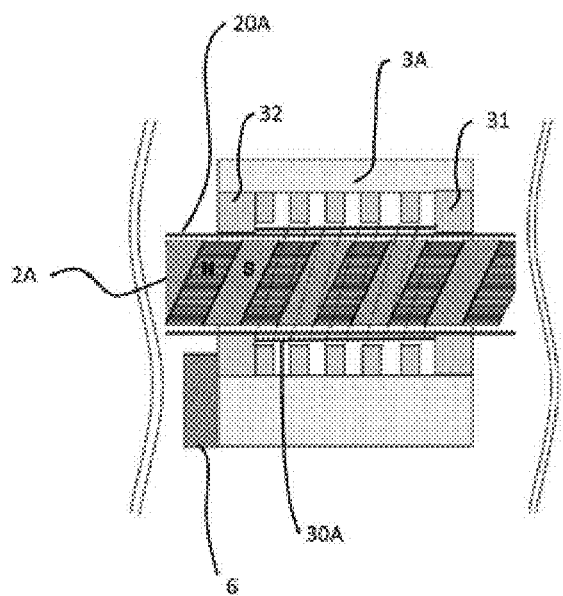
FIG. 4 is a schematic diagram of a rod-shaped member and an opposite member according to another modification of the first embodiment of the present invention.

Alternatively, as illustrated in FIG. 4, the opposite member 3A may be made of a threaded soft magnetic material. The threaded surface of the hole of the opposite member 3A is covered with a nonmagnetic thin-walled pipe 30A. This makes it possible to prevent foreign matters from adhering to the threaded grooves of the opposite member 3A. The configuration of the rod-shaped member 2A is the same as that of FIG. 2. A pitch of the threads of the opposite member 3A illustrated in FIG. 4 is substantially the same as the pitch of the magnetized zones of the rod-shaped member 2A. When the rod-shaped member 2A is rotated, a magnetic force acts between the magnetized zones of the rod-shaped member 2A and the threads of the opposite member 3A, and the opposite member 3A moves.

The rod-shaped member 2B and the opposite member 3B illustrated in FIG. 1 may also have a configuration as illustrated in FIG. 3 or 4.

Second Embodiment

Figure 5:
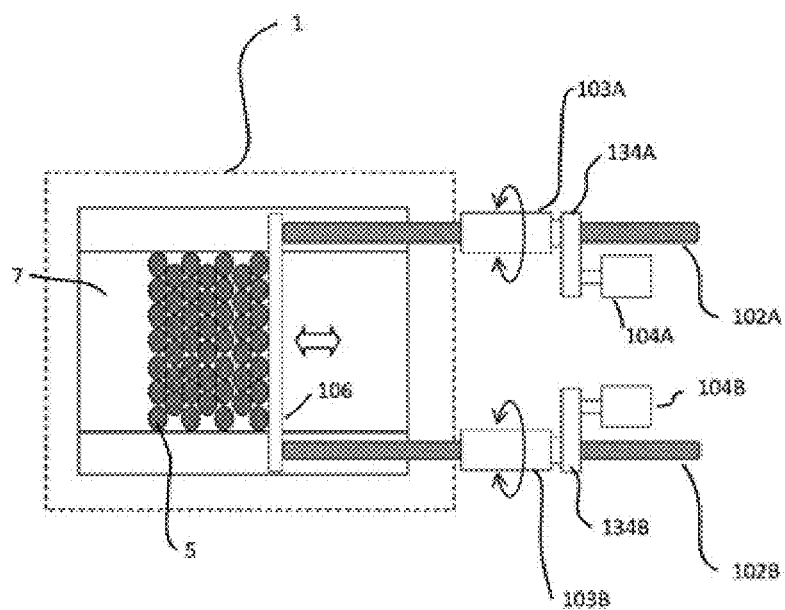
FIG. 5 is a schematic diagram of a temperature management apparatus according to a second embodiment of the present invention.

As illustrated in FIG. 5, a temperature management apparatus according to a second embodiment of the present invention includes a temperature management furnace 1 that stores articles 5 therein; rod-shaped members 102A and 102B each comprising a magnetic material; opposite members 103A and 103B that are opposed to parts of side surfaces of the rod-shaped members 102A and 102B, respectively, and each comprising a magnetic material; a driving device 104A that rotates the opposite member 103A around a central axis of the rod-shaped member 102A to change a relative position of the rod-shaped member 102A and the opposite member 103A; a driving device 104B that rotates the opposite member 103B around a central axis of the rod-shaped member 102B to change a relative position of the rod-shaped member 102B and the opposite member 103B; and a contact member 106 that moves within the temperature management furnace 1 in association with a change in a relative position between the rod-shaped members 102A, 102B and the opposite members 103A, 103B and moves the articles 5 by contact with the articles 5.

The driving device 104A disposed outside of the space whose temperature management is performed by the temperature management furnace 1 rotates the opposite member 103A disposed outside of the space whose temperature management is performed by the temperature management furnace 1 through a belt 134A and so on. The arrangement of the driving device 104A is fixed and the opposite member 103A is not allowed to move in the direction of the central axis of the rod-shaped member 102A. The driving device 104B disposed outside of the space whose temperature management is performed by the temperature control furnace 1 rotates the opposite member 103B disposed outside of the space whose temperature management is performed by the temperature management furnace 1 through a belt 134B and so on. The arrangement of the driving device 104B is fixed and the opposite member 103B is not allowed to move in the direction of the central axis of the rod-shaped member 102B. The driving devices 104A, 104B and the belts 134A, 134B may be covered with a shield or the like which prevents diffusion of possible dust, or the like.

The rod-shaped members 102A and 102B are held so as to be movable in the respective central axis directions. On the inside of the temperature management furnace 1, the contact member 106 is fixed to end portions of the rod-shaped members 102A and 102B. The rod-shaped members 102A and 102B protrude to the outside of the temperature management furnace 1 through the side wall of the temperature management furnace 1. The respective holes of the side wall of the temperature management furnace 1 through which the rod-shaped members 102A and 102B penetrate are provided with sealing members, such as oil seals. Portions of the rod-shaped members 102A and 102B projecting outside of the temperature management furnace 1 penetrate through the holes of the nut-shaped opposite members 103A and 103B. Because the rod-shaped members 102A and 102B are fixed to the contact member 106, the rod-shaped members 102A and 102B are not allowed to rotate around the respective central axes thereof.

The driving devices 104A and 104B synchronously rotate the opposite members 103A and 103B. When the driving device 104A rotates the opposite member 103A, the rod-shaped member 102A moves along the central axis of the rod-shaped member 102A due to a magnetic force. When the driving device 104B rotates the opposite member 103B, the rod-shaped member 102B moves along the central axis of the rod-shaped member 102B due to the magnetic force. The contact member 106 fixed between the rod-shaped members 102A and 102B also moves on the shelf board 7 along the central axes of the rod-shaped members 102A and 102B along with the movement of the rod-shaped members 102A and 102B. The articles 5 placed on the shelf board 7 are pushed by the contact member 106 and move on the shelf board 7.

In the temperature management apparatus according to the second embodiment described above, the driving force is transmitted between the rod-shaped members 102A, 102B and the opposite members 103A, 103B in a non-contact manner by the aid of the magnetic force. Therefore, when the driving force is transmitted between the rod-shaped members 102A, 102B and the opposite members 103A, 103B, heat and dust are less likely to be generated. For that reason, even when the rod-shaped members 102A, 102B and the opposite members 103A, 103B are disposed in, for example, a clean room, the influence of heat generation in the clean room can be suppressed and the clean room can be kept clean.

Furthermore, since the driving devices 104A and 104B are disposed outside of the space whose temperature management is performed by the temperature management furnace 1, even if dust is generated in the driving devices 104A and 104B, the dust is less likely to enter the space whose temperature management is performed by the temperature management furnace 1. In addition, because the driving devices 104A and 104B are disposed outside of the space whose temperature management is performed by the temperature management furnace 1, temperature unevenness is less likely to occur inside of the temperature management furnace 1. Still further, in the temperature management apparatus according to the second embodiment, because the rod-shaped members 102A and 102B do not rotate, there is no need to install bearings, and so on, in the temperature management furnace 1. Therefore, the temperature management apparatus according to the second embodiment can keep the inside of the temperature management furnace 1 clean, and suppress temperature unevenness inside of the temperature management furnace 1.

Third Embodiment

Figure 6:
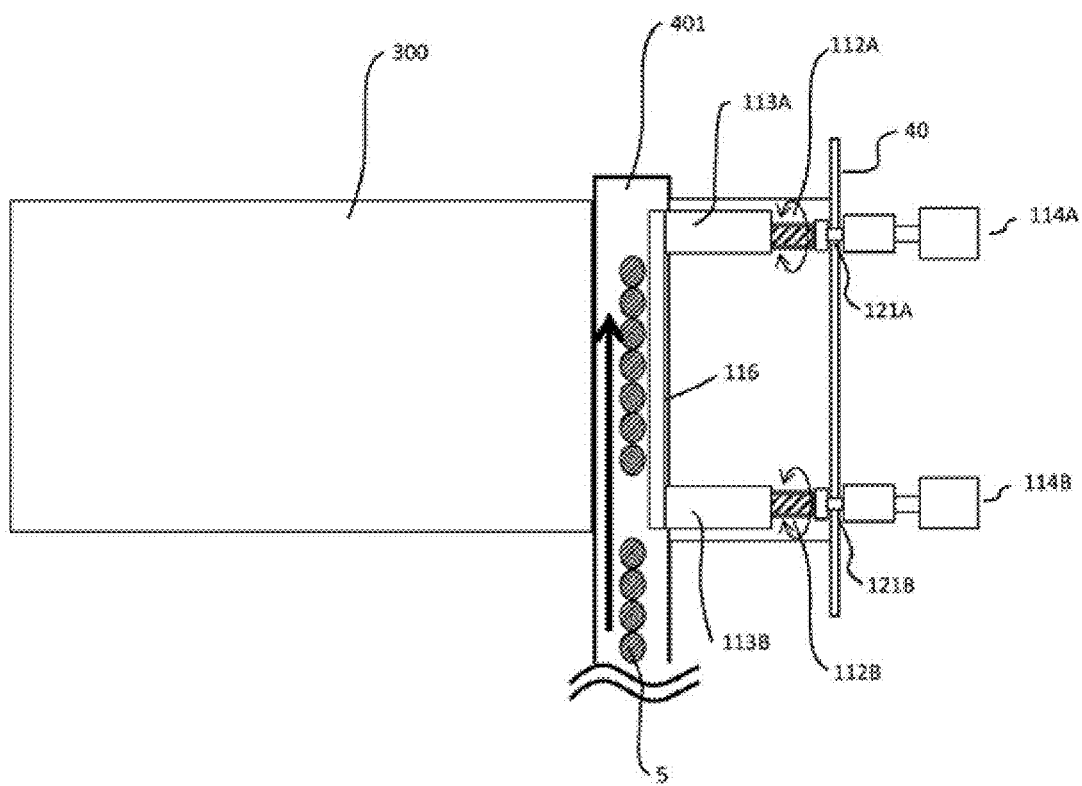
FIG. 6 is a schematic diagram of a transfer apparatus according to a third embodiment of the present invention.

As illustrated in FIG. 6, a transfer apparatus according to a third embodiment comprises rod-shaped members 112A and 112B each comprising a magnetic material; opposite members 113A and 113B that are opposed to parts of side surfaces of the rod-shaped members 112A and 112B, respectively, and each comprising a magnetic material; a driving device 114A that rotates the rod-shaped member 112A around a central axis thereof to change a relative position of the rod-shaped member 112A and the opposite member 113A; a driving device 114B that rotates the rod-shaped member 112B around a central axis thereof to change a relative position of the rod-shaped member 112B and the opposite member 113B; and a contact member 116 that moves in association with a change in relative positions between the rod-shaped members 112A, 112B and the opposite members 113A, 113B and moves the articles 5 by contact with the articles 5 to be transferred inside and outside a temperature management furnace.

The temperature management furnace into which the articles 5 are carried, is, for example, a freeze drying furnace. The articles 5 are, for example, vials into which a medicine has been injected.

A shield 40 may be disposed between the rod-shaped members 112A, 112B and the driving devices 114A, 114B so as to prevent dust and heat that may be generated in the driving devices 114A and 114B from reaching the articles 5. The driving device 114A and the rod-shaped member 112A are connected to each other through, for example, a mandrel 121A that penetrates through the shield 40. The driving device 114B and the rod-shaped member 112B are connected to each other through, for example, a mandrel 121B that penetrates through the shield 40. Holes of the shield 40 through which the mandrels 121A and 121B penetrate are provided with, for example, sealing members, such as oil seals. A shape of the shield 40 is not limited as long as the shield 40 can prevent the diffusion of possible dust.

For example, the transfer apparatus according to the third embodiment is disposed on a side of a belt conveyor 401 that conveys the articles 5 to be carried into the temperature management furnace. For example, a transfer base 300 is disposed on an opposite side of the belt conveyor 401. When the articles 5 are carried to a front of the contact member 116 by the aid of the belt conveyor 401, the driving devices 114A and 114B synchronously rotate the rod-shaped members 112A and 112B and move the opposite members 113A and 113B along the central axes of the rod-shaped members 112A and 112B by the aid of the magnetic force. The articles 5 on the belt conveyor 401 are pushed by the contact member 116 fixed to the opposite members 113A and 113B out onto the transfer base 300.

With the transfer apparatus according to the third embodiment, the articles 5 can be transferred without allowing heat to be applied or dust to adhere to the articles 5 to be carried into the temperature management furnace, in which temperature distribution unevenness and the presence of dust are undesirable.

Fourth Embodiment

Figure 7:
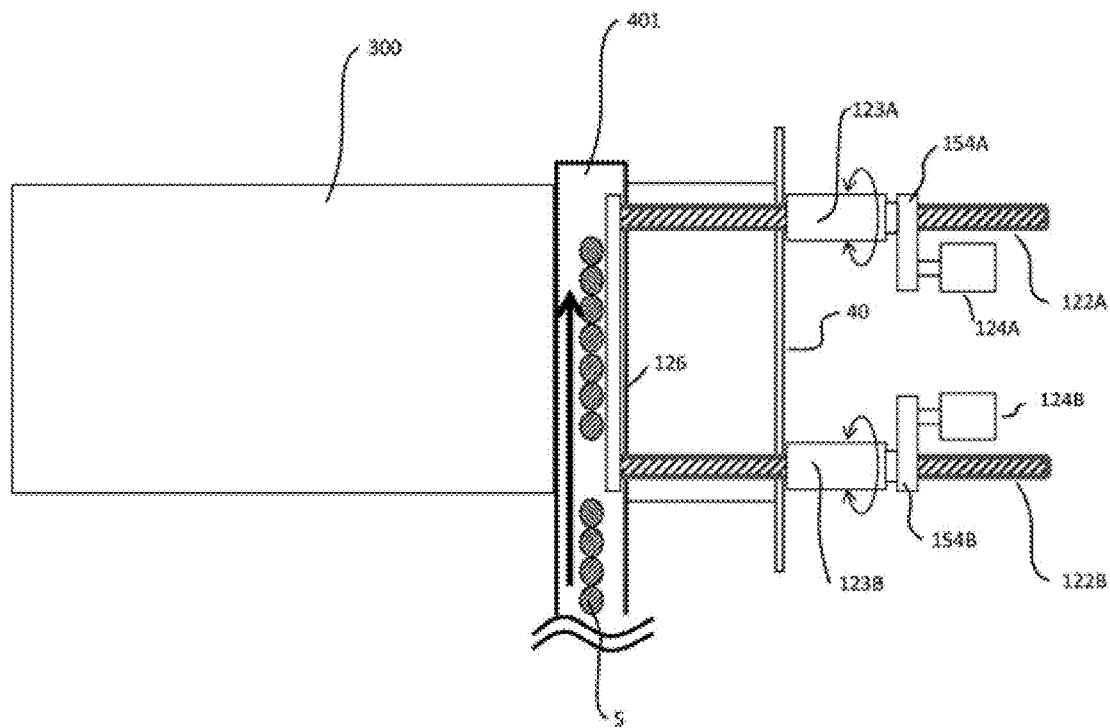
FIG. 7 is a schematic diagram of a transfer apparatus according to a fourth embodiment of the present invention.

As illustrated in FIG. 7, a transfer apparatus according to a fourth embodiment comprises rod-shaped members 122A and 122B each comprising a magnetic material; opposite members 123A and 123B that are opposed to parts of side surfaces of the rod-shaped members 122A and 122B, respectively, and each comprising a magnetic material; a driving device 124A that rotates the opposite member 123A around a central axis of the rod-shaped member 122A to change a relative position of the rod-shaped member 122A and the opposite member 123A; a driving device 124B that rotates the opposite member 123B around a central axis of the rod-shaped member 122B to change a relative position of the rod-shaped member 122B and the opposite member 123B; and a contact member 126 that moves in association with a change in relative positions between the rod-shaped members 122A, 122B and the opposite members 123A, 123B and that moves the articles 5 by contact with the articles 5 to be transferred inside and outside a temperature management furnace.

The driving device 124A rotates the opposite member 123A through a belt 154A and so on. The driving device 124B rotates the opposite member 123B through a belt 154B and so on.

A shield 40 may be disposed between the contact member 126 and the opposite members 123A, 123B so as to prevent dust and heat that may be generated in the driving devices 124A and 124B from reaching the articles 5. In that case, the rod-shaped members 122A and 122B penetrate through the shield 40. Holes of the shield 40 through which the rod-shaped members 122A and 122B penetrate are provided with, for example, sealing members, such as oil seals. A shape of the shield 40 is not limited as long as the shield 40 can prevent the diffusion of possible dust.

When the articles 5 are carried to a front of the contact member 126 by the aid of the belt conveyor 401, the driving devices 124A and 124B synchronously rotate the opposite members 123A and 123B and move the rod-shaped members 122A and 122B in the respective central axis directions by the aid of the magnetic force. The articles 5 on the belt conveyor 401 are pushed by the contact member 126 fixed to the rod-shaped members 122A and 122B out onto the transfer base 300.

Similarly, with the transfer apparatus according to the fourth embodiment, the articles 5 can be transferred without allowing heat to be applied or dust to adhere to the articles 5 to be carried into the temperature management furnace, in which temperature distribution unevenness and the presence of dust are undesirable.

Fifth Embodiment

Figure 8:
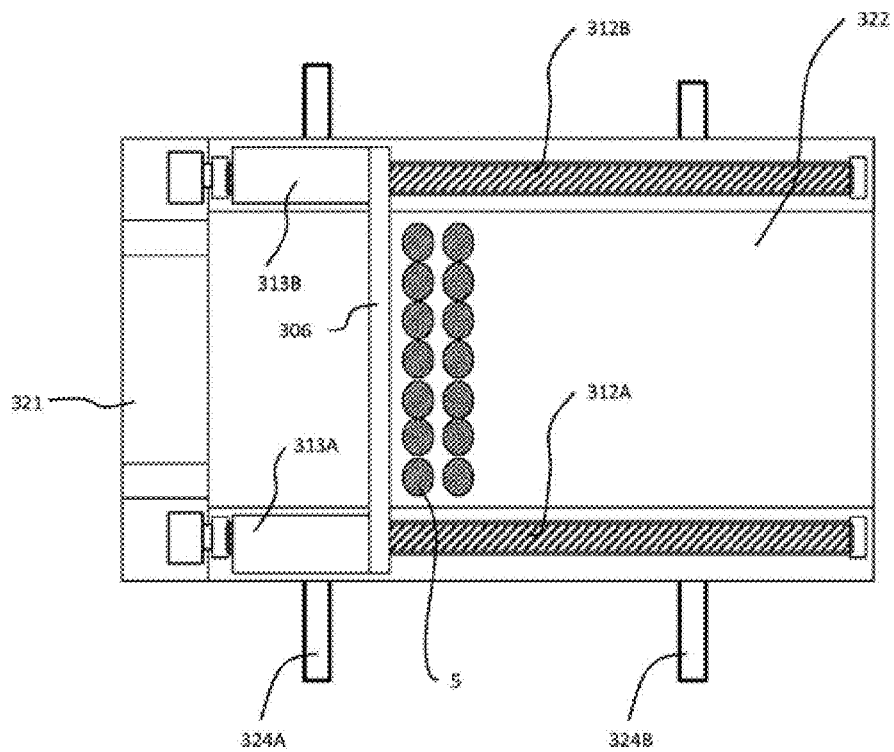
FIG. 8 is a schematic top diagram of a transfer base according to a fifth embodiment of the present invention.
Figure 9:
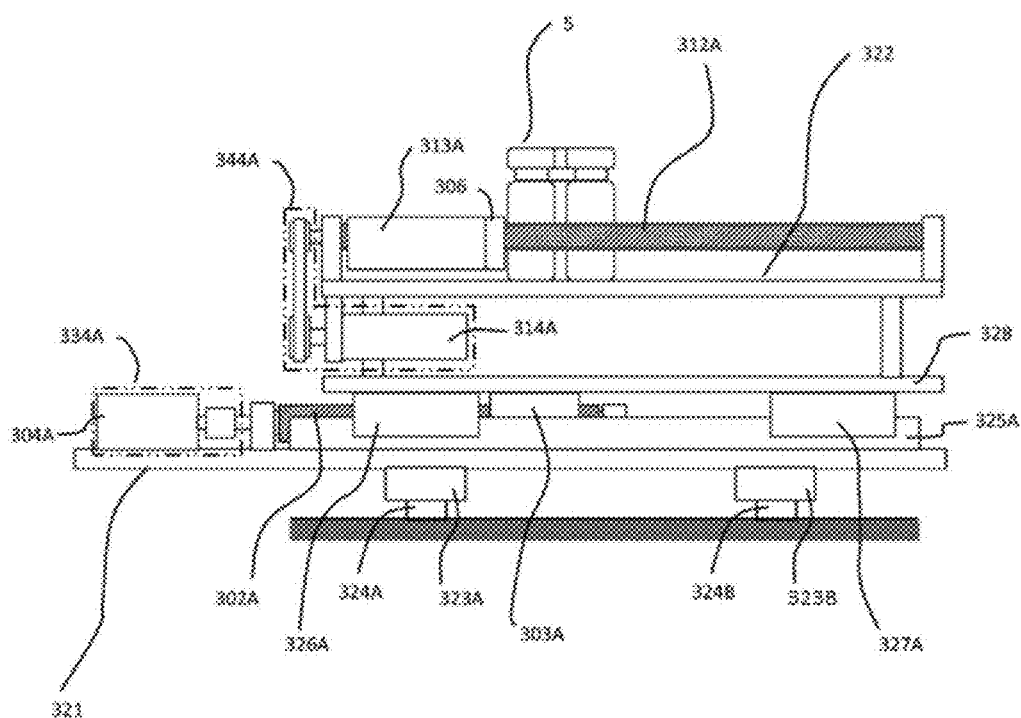
FIG. 9 is a schematic side diagram of a transfer base according to the fifth embodiment of the present invention.

As illustrated in FIG. 8 that is a top view and FIG. 9 that is a side view, a transfer base according to a fifth embodiment comprises a base member 321, a table 322 that is located on the base member 321, a table movement rod-shaped member 302A that is at least partially disposed on the base member 321 and comprises a magnetic material, a table movement opposite member 303A that is opposed to a part of a side surface of the table movement rod-shaped member 302A and comprises a magnetic material, and a table driving device 304A that rotates the table movement rod-shaped member 302A around a central axis thereof and changes a relative position between the table movement rod-shaped member 302A and the table movement opposite member 303A to move the table 322.

The transfer base according to the fifth embodiment further comprises a contact member 306 for moving the articles 5 by contact with the articles 5 placed on the table 322, contact member movement rod-shaped members 312A and 312B that are at least partially disposed on the table 322 and each comprising a magnetic material, contact member movement opposite members 313A and 313B that are opposed to parts of side surfaces of the contact member movement rod-shaped members 312A and 312B, respectively, and each comprising a magnetic material, a contact member driving device 314A that rotates the contact member movement rod-shaped member 312A around a central axis thereof and changes a relative position between the contact member movement rod-shaped member 312A and the contact member movement opposite member 313A to move the contact member 306, and a contact member driving device (not shown), which rotates the contact member movement rod-shaped member 312B around a central axis thereof and changes a relative position between the contact member movement rod-shaped member 312B and the contact member movement opposite member 313B to move the contact member 306.

The transfer base according to the fifth embodiment is used for carrying the articles 5 into the temperature management furnace or for carrying the article 5 out of the temperature management furnace. The temperature management furnace, into which the articles 5 are carried, is, for example, a freeze drying furnace. The articles 5 are, for example, vials into which a medicine has been injected.

For example, wheels 323A and 323B may be provided on a bottom surface side of the base member 321. The wheels 323A and 323B may rotate on floor rails 324A and 324B, respectively.

The table movement rod-shaped member 302A is held, for example, by a bearing, or the like, disposed on the base member 321. The table driving device 304A is fixed on the base member 321, and covered with a shield 334A for prevention of dust. The table driving device 304A and the table movement rod-shaped member 302A are connected to each other, for example, through a mandrel. A hole of the shield 334A through which the mandrel penetrates is provided with, for example, a sealing member, such as an oil seal.

For example, a table movement rail 325A is disposed on the base member 321. In addition, a drive transmission member 328 is disposed over the base member 321 through guides 326A and 327A slidable on the table movement rail 325A. The drive transmission member 328 is fixed to the table movement opposite member 303A and the table 322.

When the table driving device 304A rotates the table movement rod-shaped member 302A, the table movement opposite member 303A moves along the central axis of the table movement rod-shaped member 302A by the aid of a magnetic force. In association with the above movement, the drive transmission member 328 fixed to the table movement opposite member 303A moves along the central axis of the table movement rod-shaped member 302A. Further, the table 322 fixed to the drive transmission member 328 moves along the central axis of the table movement rod-shaped member 302A.

On the base member 321, another set of a table driving device, a table movement rod-shaped member, and a table movement opposite member may be disposed in parallel to the table driving device 304A, the table movement rod-shaped member 302A, and the table movement opposite member 303A.

The respective contact member movement rod-shaped members 312A and 312B are held by bearings, or the like, disposed on the table 322. The contact member driving device 314A is fixed to the table 322. The contact member driving device 314A and the contact member movement rod-shaped member 312A are connected to each other, for example, through a belt drive. The contact member driving device 314A and the belt drive are covered with, for example, a shield 344A for prevention of dust. For example, a sealing member, or the like, such as an oil seal, is provided in a hole of the shield 344A through which a mandrel connecting a pulley of the belt drive and the contact member movement rod-shaped member 312A penetrates.

When the contact member driving device 314A rotates the contact member movement rod-shaped member 312A, the contact member movement opposite member 313A moves along the central axis of the contact member movement rod-shaped member 312A by the aid of a magnetic force. When the contact member driving device (not shown) rotates the contact member movement rod-shaped member 312B in synchronization with the contact member driving device 314A, the contact member movement opposite member 313B moves along the central axis of the contact member movement rod-shaped member 312B by the aid of a magnetic force. In association with the above movement, the contact member 306 fixed to the contact member movement opposite members 313A and 313B moves along the central axes of the contact member movement rod-shaped members 312A and 312B. The articles 5 placed on the table 322 are pushed by the contact member 306 and move on the table 322.

According to the transfer base according to the fifth embodiment, the articles 5 can be transferred without allowing heat to be applied or dust to adhere to the articles 5 to be carried into the temperature management furnace, in which the temperature distribution unevenness and the mixture of dust are undesirable.

Modification of Fifth Embodiment

In the fifth embodiment, the example in which the table driving device rotates the table movement rod-shaped member to move the table movement opposite member fixed to the table has been described. In the alternative, the table movement rod-shaped member may be fixed to the table and the table movement opposite member may be rotated by the table driving device so that the table movement rod-shaped member fixed to the table is moved in the central axis direction by the magnetic force.

In the fifth embodiment, the example in which the contact member driving device rotates the contact member movement rod-shaped member to move the contact member movement opposite member fixed to the contact member has been described. Alternatively, the contact member movement rod-shaped member may be fixed to the contact member and the contact member movement opposite member may be rotated by the contact member driving device so that the contact member movement rod-shaped member fixed to the contact member is moved in the central axis direction by the magnetic force.

Sixth Embodiment

Figure 10:
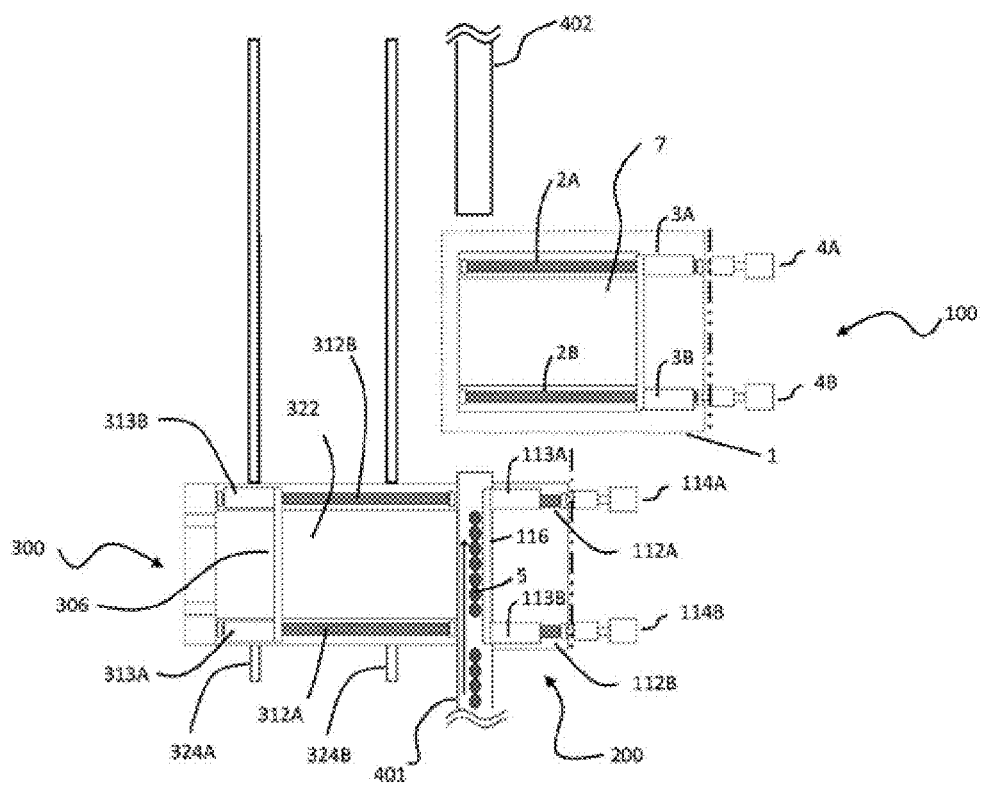
FIG. 10 is a schematic diagram illustrating one example of use of a transfer apparatus, a transfer base, and a temperature management apparatus according to a sixth embodiment of the present invention.
Figure 11:
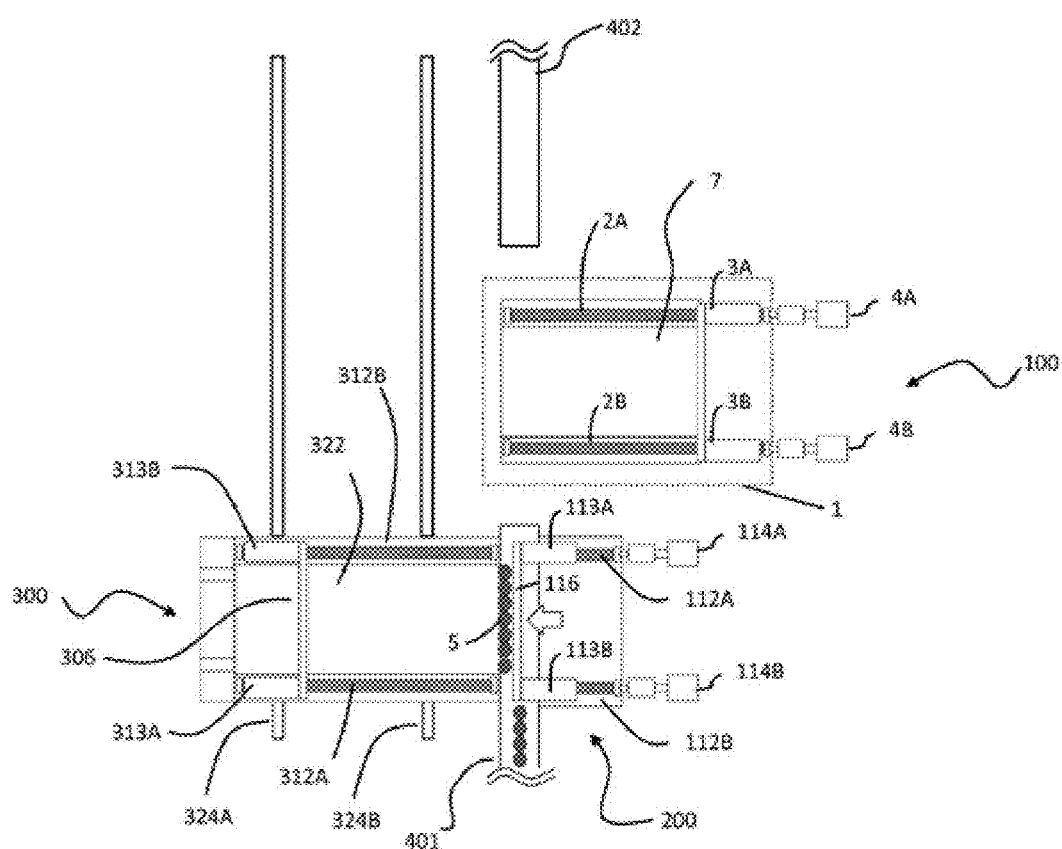
FIG. 11 is a schematic diagram illustrating another example of use of a transfer apparatus, a transfer base, and a temperature management apparatus according to the sixth embodiment of the present invention.
Figure 12:
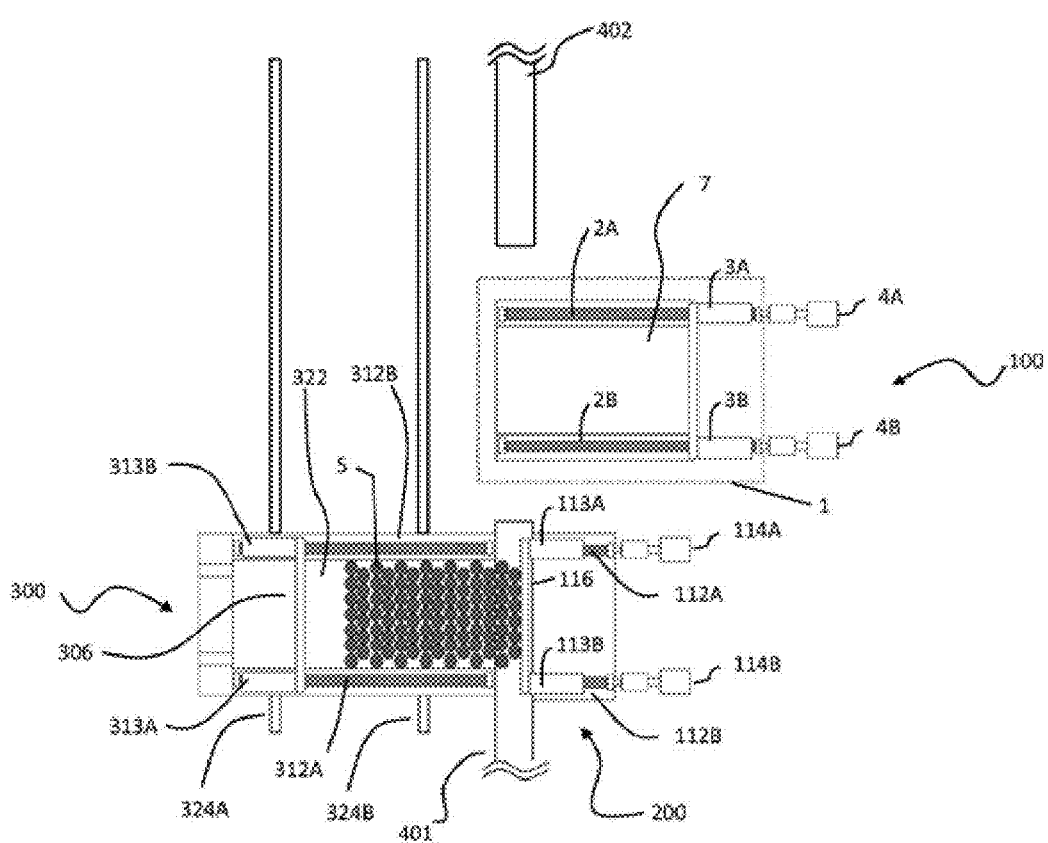
FIG. 12 is a schematic diagram illustrating still another example of use of a transfer apparatus, a transfer base, and a temperature management apparatus according to the sixth embodiment of the present invention.
Figure 13:
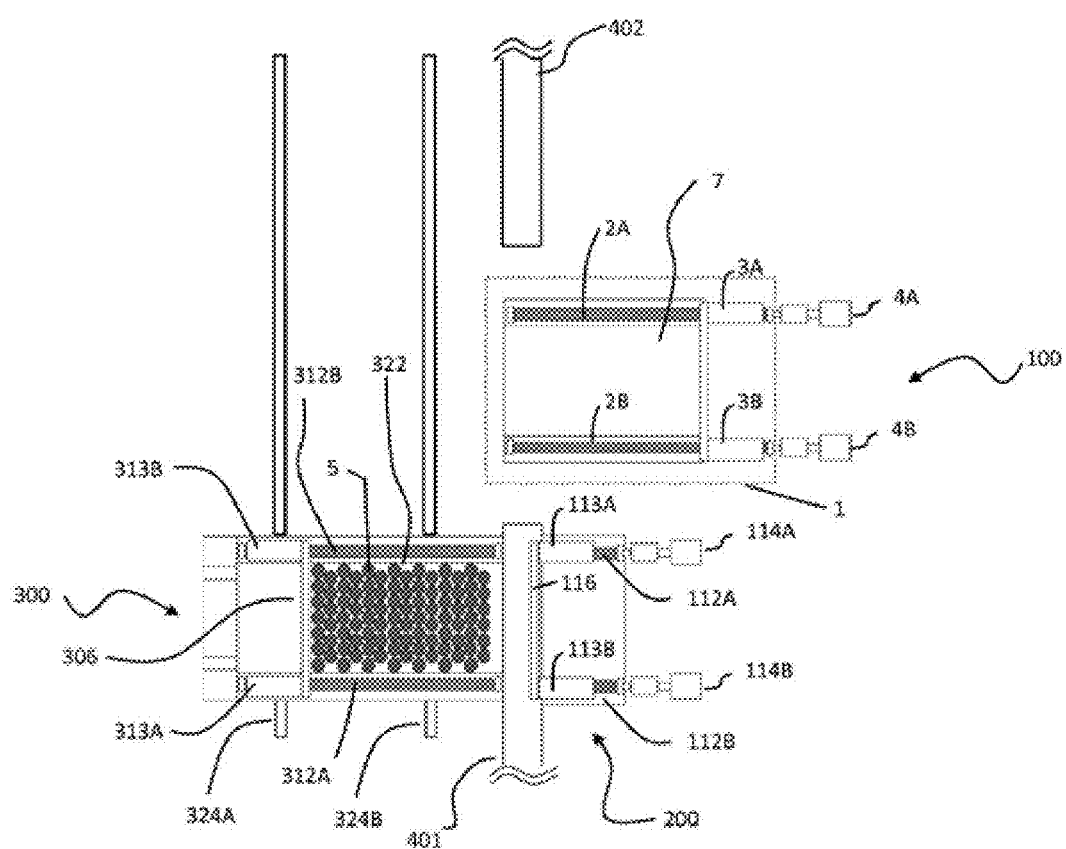
FIG. 13 is a schematic diagram illustrating still another example of use of a transfer apparatus, a transfer base, and a temperature management apparatus according to the sixth embodiment of the present invention.

In a sixth embodiment, as illustrated in FIG. 10, a temperature management apparatus 100, a transfer apparatus 200, and a transfer base 300 are used in combination. The temperature management apparatus 100 is configured as described in the first embodiment. The transfer apparatus 200 is configured as described in the third embodiment. The transfer base 300 is configured as described in the fifth embodiment. In the sixth embodiment, a belt conveyor 401 for transferring the articles 5 to be carried to the temperature management apparatus 100 and a belt conveyor 402 for transferring the articles 5 to be carried from the temperature management apparatus 100 are additionally used in combination.

The temperature management apparatus 100 is disposed between the belt conveyor 401 and the belt conveyor 402. The transfer base 300 is movable on the floor rails 324A and 324B through the belt conveyor 401, the temperature management apparatus 100, and the belt conveyor 402. The transfer apparatus 200 is disposed so as to face the belt conveyor 401. Before the articles 5 are carried into the temperature management apparatus 100, the transfer base 300 is disposed so as to face the transfer apparatus 200 across the belt conveyor 401. In this situation, the transfer base 300 allows the table driving device 304A illustrated in FIG. 9 to rotate the table movement rod-shaped member 302A so that the table 322 fixed to the table movement opposite member 303A is brought close to the belt conveyor 401 illustrated in FIG. 10.

As illustrated in FIGS. 10 to 13, the belt conveyor 401 transfers a predetermined number of articles 5 to be carried into the temperature management apparatus 100 in a line. The driving devices 114A and 114B of the transfer apparatus 200 repeat the operation of rotating the rod-shaped members 112A and 112B in synchronization, moving the opposite members 113A and 113B, and pushing the articles 5 aligned on the belt conveyor 401 onto the table 322 of the transfer base 300 with the use of the contact member 116.

Figure 14:
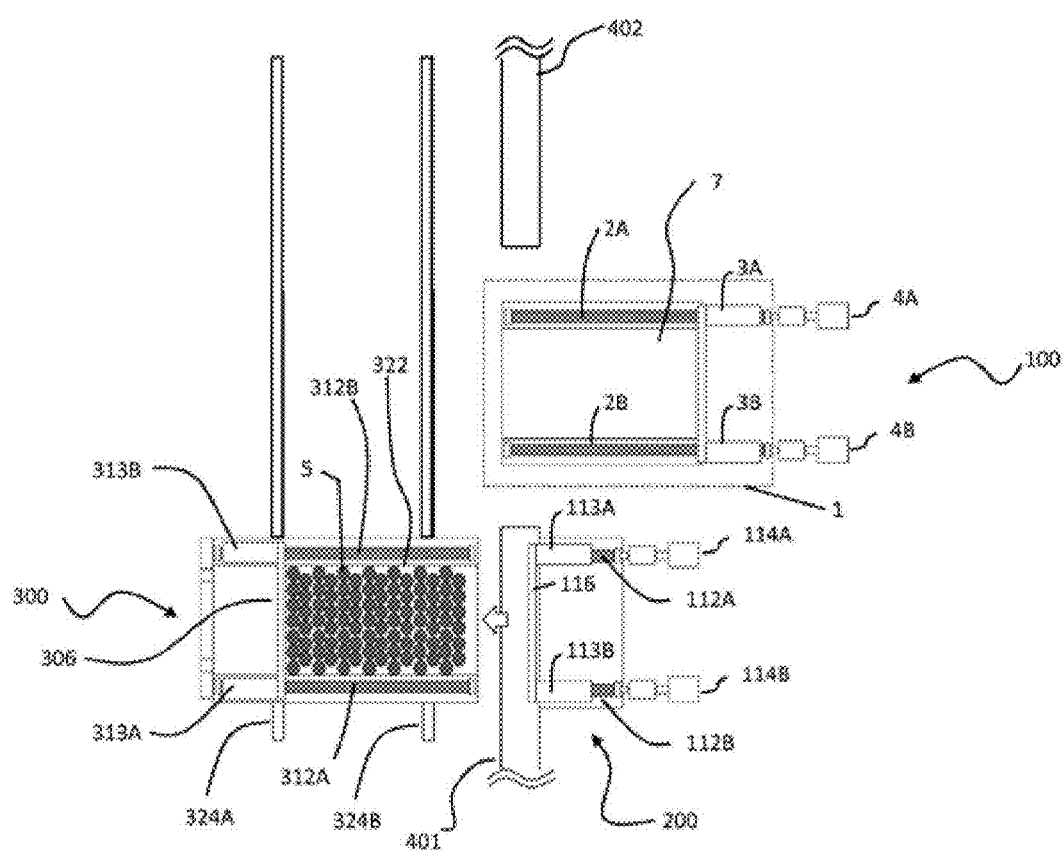
FIG. 14 is a schematic diagram illustrating still another example of use of a transfer apparatus, a transfer base, and a temperature management apparatus according to the sixth embodiment of the present invention.
Figure 15:
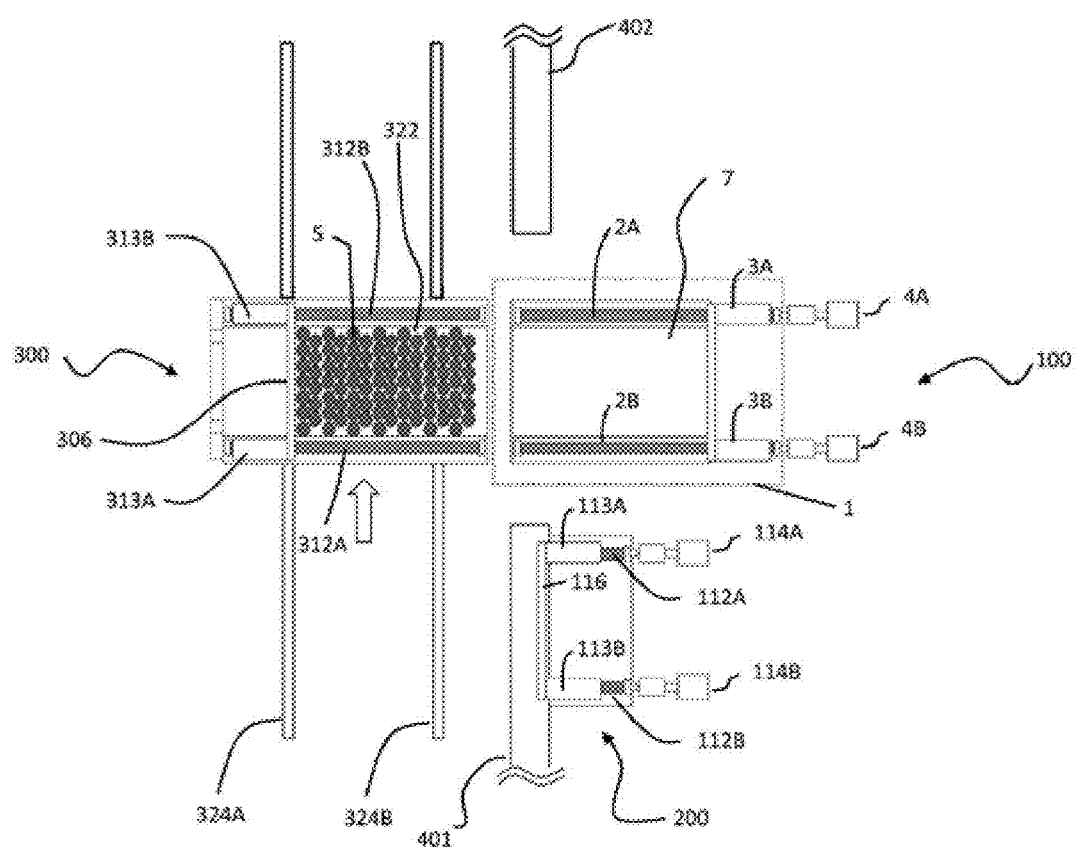
FIG. 15 is a schematic diagram illustrating still another example of use of a transfer apparatus, a transfer base, and a temperature management apparatus according to the sixth embodiment of the present invention.
Figure 16:
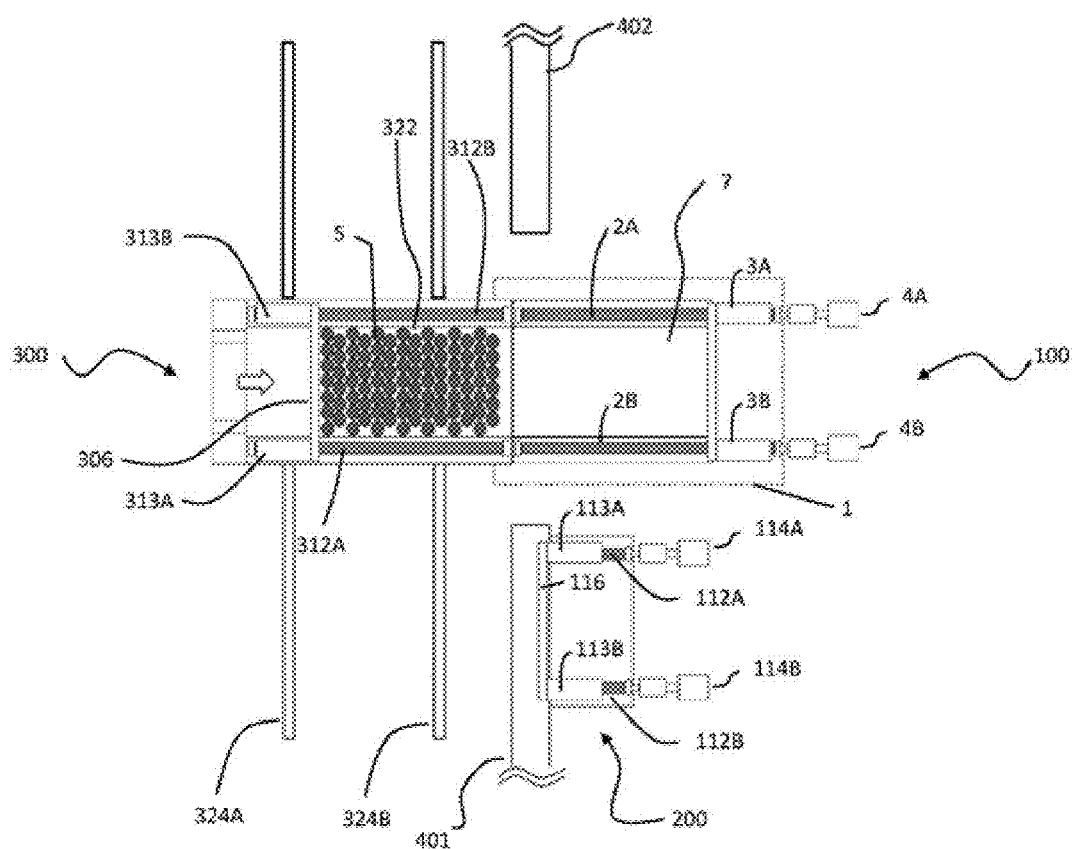
FIG. 16 is a schematic diagram illustrating still another example of use of a transfer apparatus, a transfer base, and a temperature management apparatus according to the sixth embodiment of the present invention.

As illustrated in FIG. 14, when the predetermined number of articles 5 are put on the table 322 of the transfer base 300, the transfer base 300 allows the table driving device 304A illustrated in FIG. 9 to rotate the table movement rod-shaped member 302A so that the table 322 fixed to the table movement opposite member 303A is spaced apart from the belt conveyor 401 illustrated in FIG. 14. Next, as illustrated in FIG. 15, the transfer base 300 moves on the floor rails 324A and 324B up to a position to face the temperature management apparatus 100. Thereafter, as illustrated in FIG. 16, the transfer base 300 allows the table driving device 304A illustrated in FIG. 9 to rotate the table movement rod-shaped member 302A so that the table 322 fixed to the table movement opposite member 303A is brought closer to the shelf board 7 within the temperature management apparatus 100 illustrated in FIG. 16.

Figure 17:
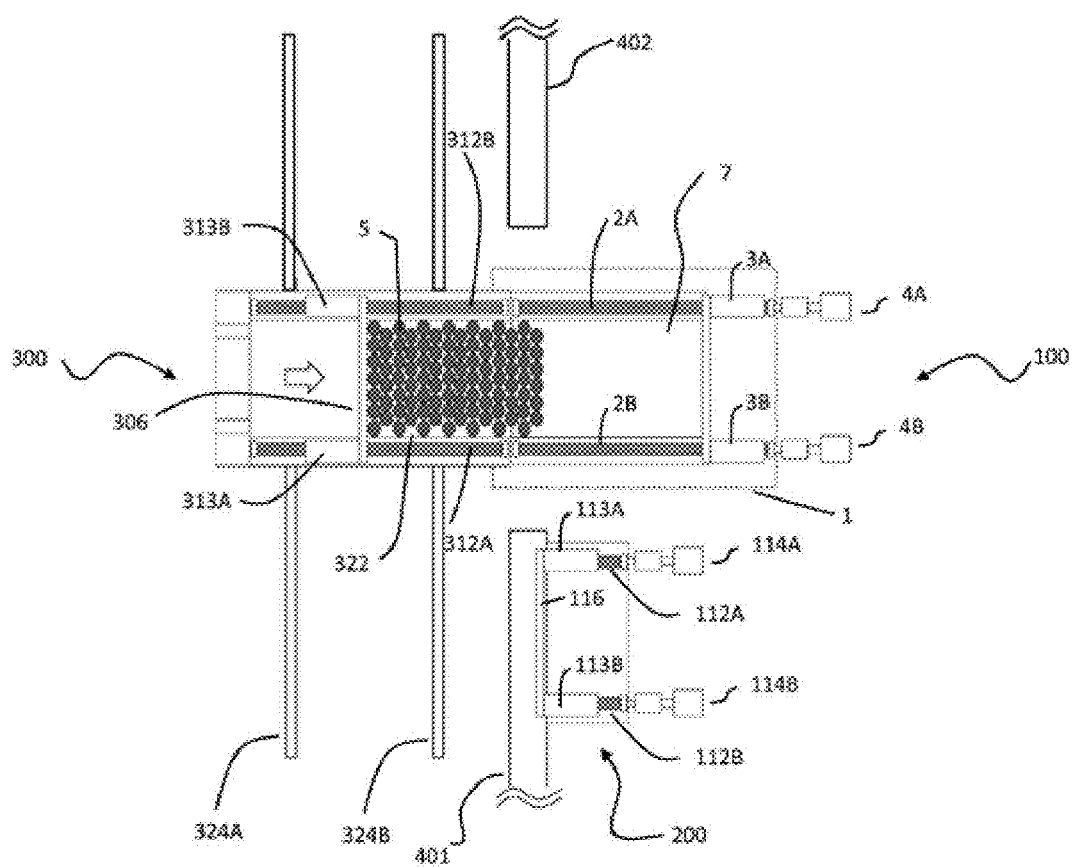
FIG. 17 is a schematic diagram illustrating still another example of use of a transfer apparatus, a transfer base, and a temperature management apparatus according to the sixth embodiment of the present invention.
Figure 18:
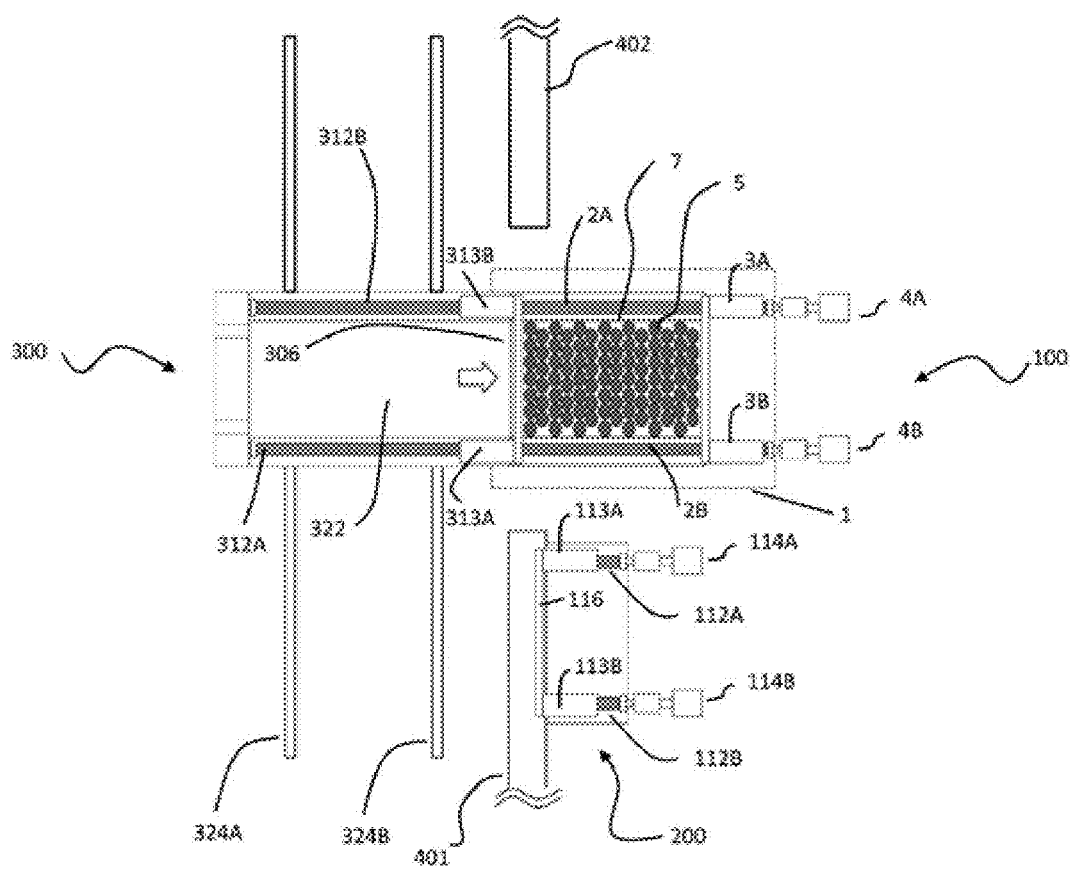
FIG. 18 is a schematic diagram illustrating still another example of use of a transfer apparatus, a transfer base, and a temperature management apparatus according to the sixth embodiment of the present invention.
Figure 19:
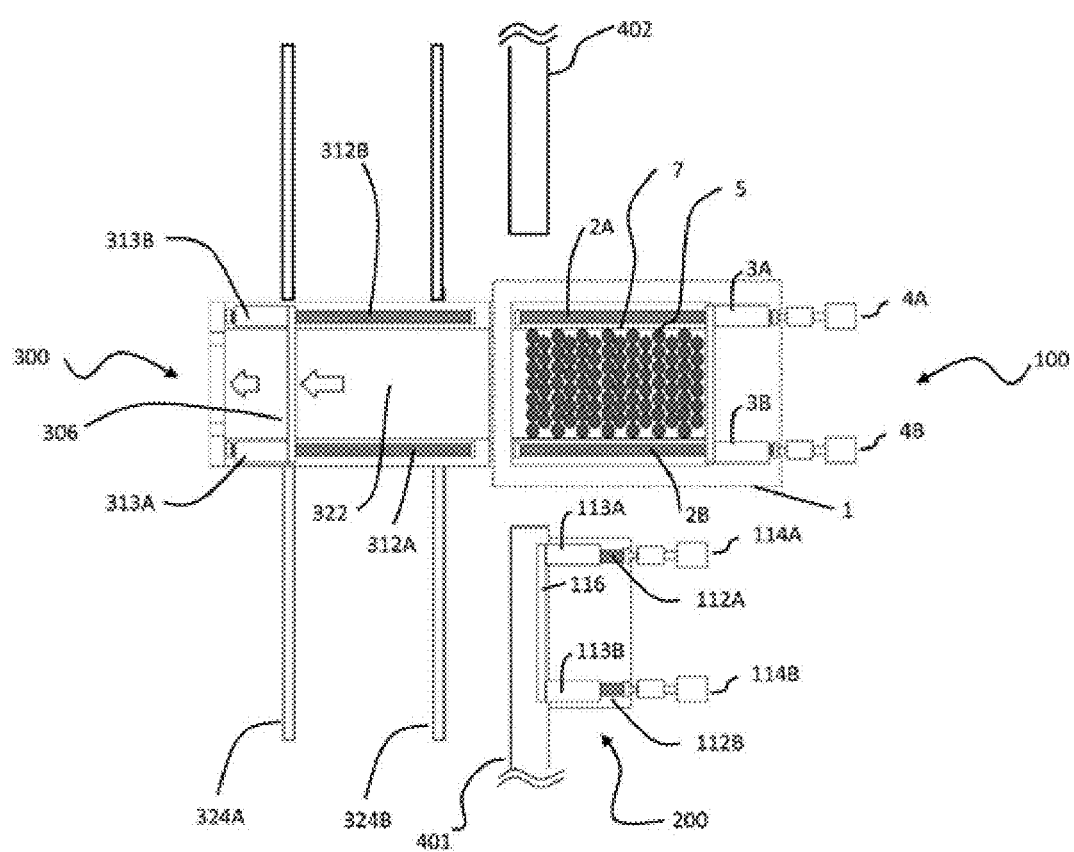
FIG. 19 is a schematic diagram illustrating still another example of use of a transfer apparatus, a transfer base, and a temperature management apparatus according to the sixth embodiment of the present invention.

Further, as illustrated in FIGS. 17 and 18, the contact member driving device of the transfer base 300 rotates the contact member movement rod-shaped members 312A and 312B, moves the contact member movement opposite members 313A and 313B, and pushes the articles 5 on the table 322 onto the shelf board 7 in the temperature management furnace 1 of the temperature management apparatus 100 by the aid of the contact member 306. After having pushed all of the articles 5 onto the shelf board 7, as illustrated in FIG. 19, the transfer base 300 separates the table 322 from the temperature management apparatus 100. Further, the transfer base 300 moves the contact member 306 in a direction opposite to the temperature management apparatus 100.

Figure 20:
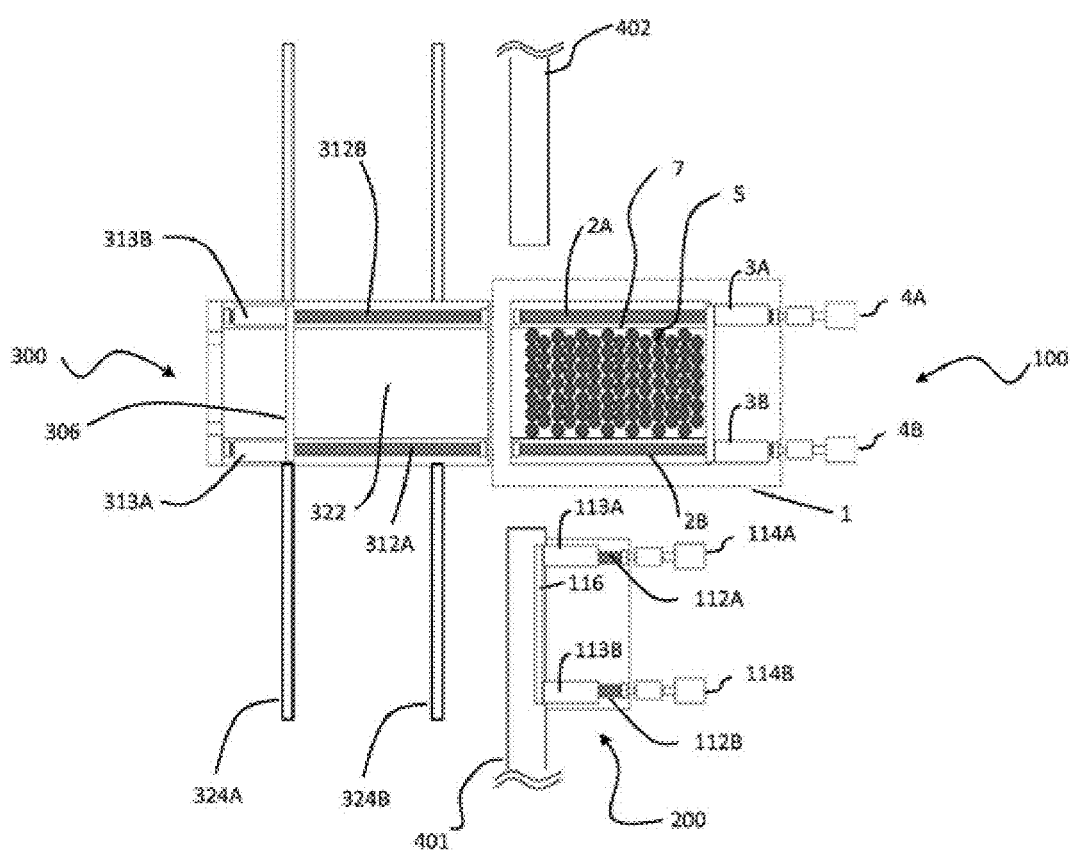
FIG. 20 is a schematic diagram illustrating still another example of use of a transfer apparatus, a transfer base, and a temperature management apparatus according to the sixth embodiment of the present invention.
Figure 21:
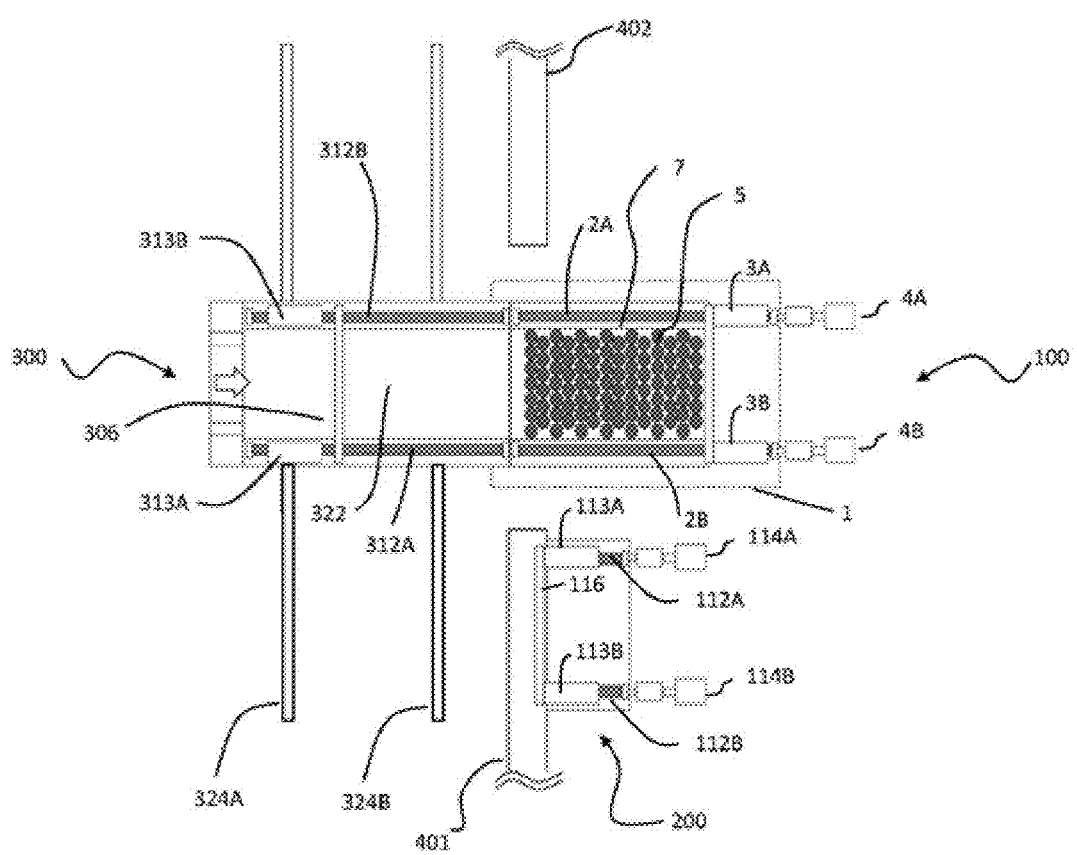
FIG. 21 is a schematic diagram illustrating still another example of use of a transfer apparatus, a transfer base, and a temperature management apparatus according to the sixth embodiment of the present invention.
Figure 22:
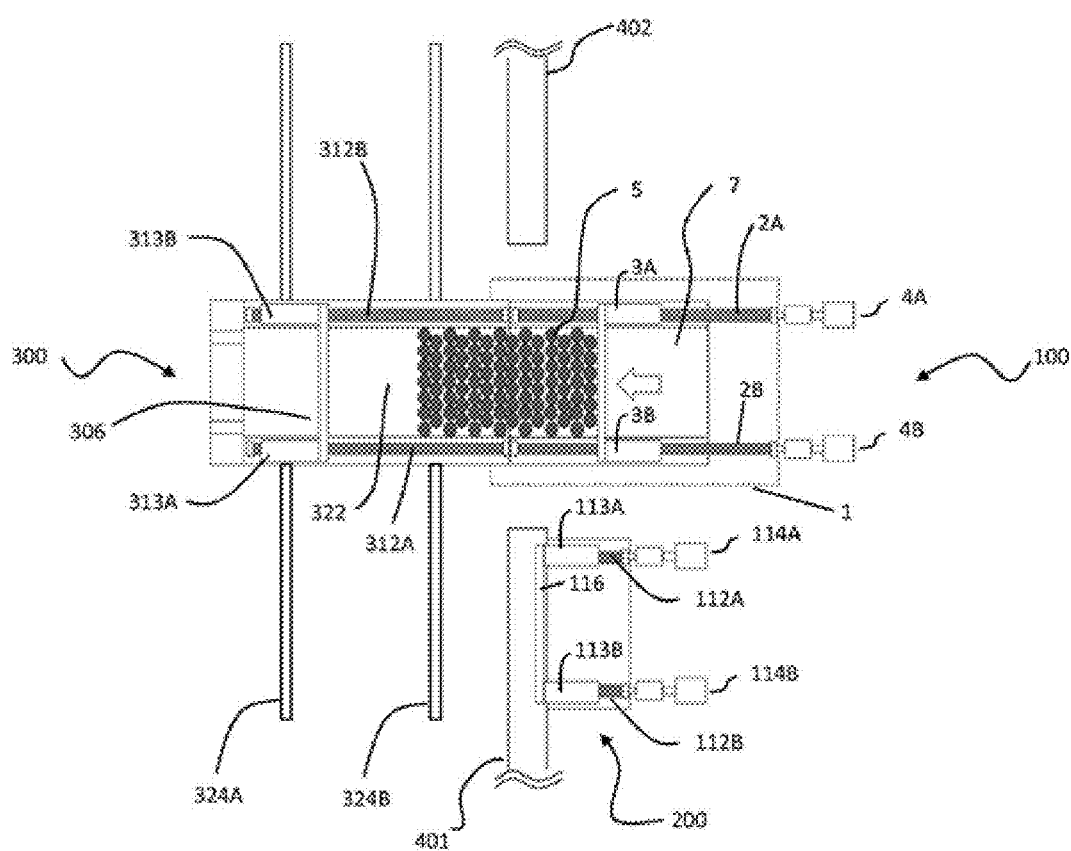
FIG. 22 is a schematic diagram illustrating still another example of use of a transfer apparatus, a transfer base, and a temperature management apparatus according to the sixth embodiment of the present invention.
Figure 23:
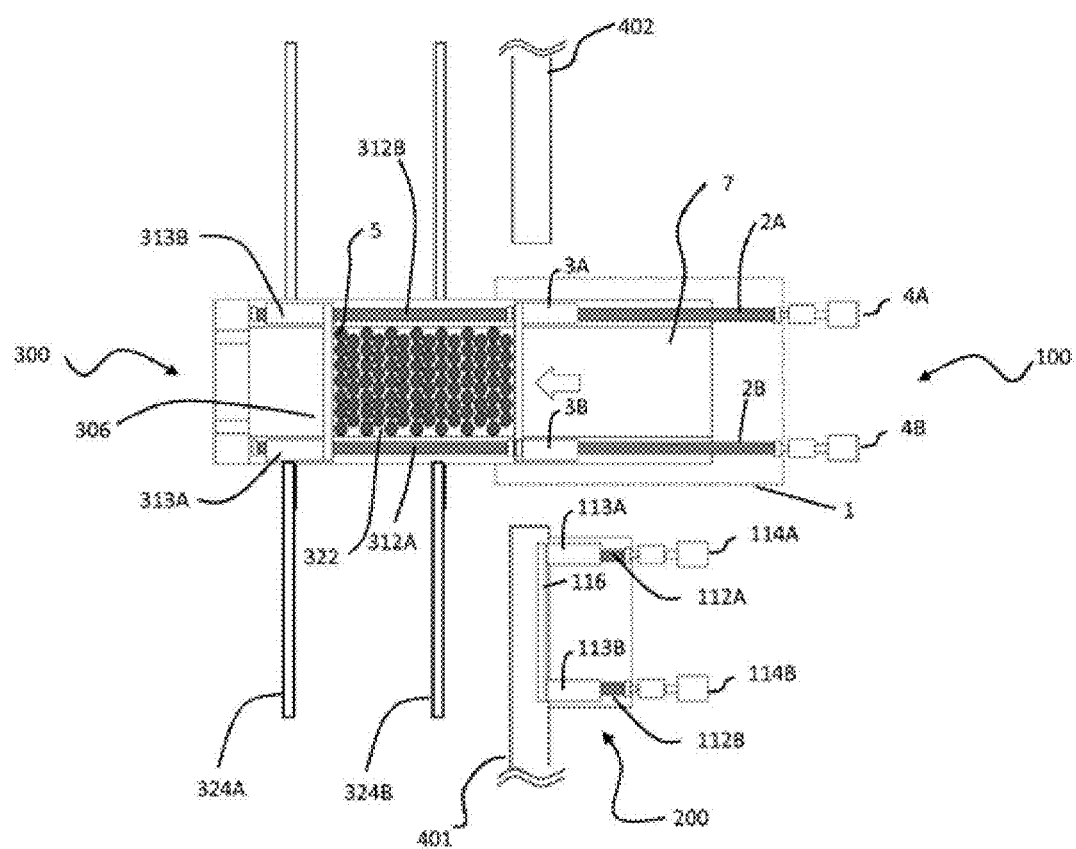
FIG. 23 is a schematic diagram illustrating still another example of use of a transfer apparatus, a transfer base, and a temperature management apparatus according to the sixth embodiment of the present invention.
Figure 24:
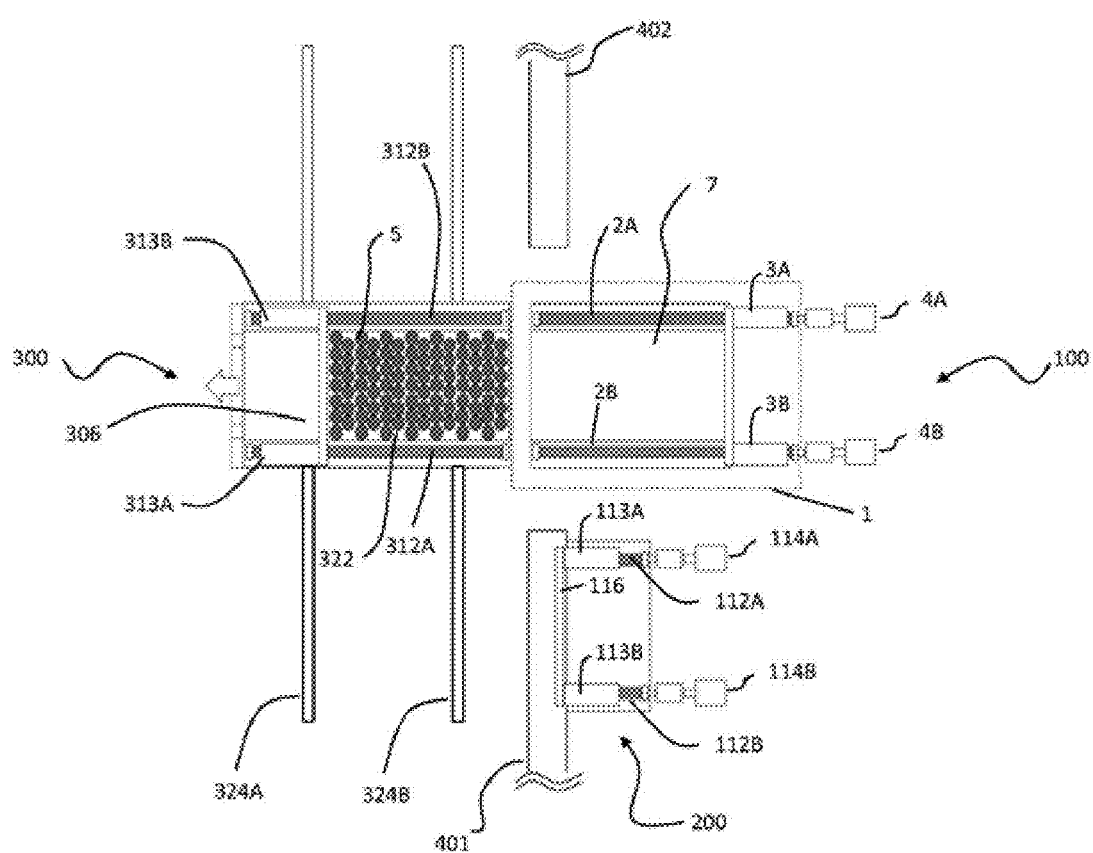
FIG. 24 is a schematic diagram illustrating still another example of use of a transfer apparatus, a transfer base, and a temperature management apparatus according to the sixth embodiment of the present invention.

Referring to FIG. 20, the temperature management apparatus 100 closes a door of the temperature management furnace 1 and subjects the articles 5 in the temperature management furnace 1 to, for example, a freeze drying process. After having completed the freeze drying process of the articles 5, the temperature management apparatus 100 opens the door of the temperature management furnace 1, and as illustrated in FIG. 21, the transfer base 300 brings the table 322 closer to the shelf board 7 in the temperature management apparatus 100. As illustrated in FIGS. 22 and 23, the driving devices 4A and 4B of the temperature management apparatus 100 synchronously rotate the rod-shaped members 2A and 2B to move the opposite members 3A and 3B and push out the articles 5 placed on the shelf board 7 onto the table 322 of the transfer base 300 by the aid of the contact member 6. As illustrated in FIG. 24, after all of the articles 5 have been pushed out onto the table 322 of the transfer base 300, the transfer base 300 separates the table 322 from the temperature management apparatus 100.

Figure 25:
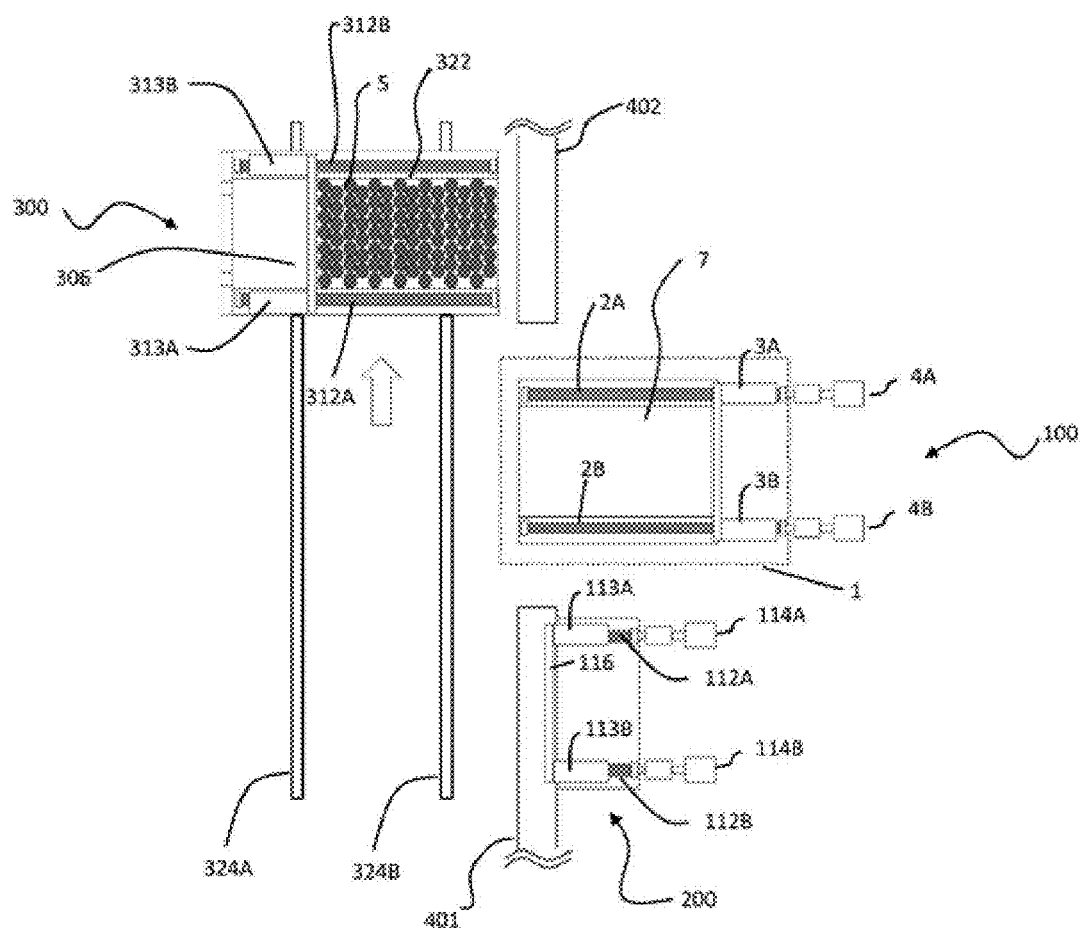
FIG. 25 is a schematic diagram illustrating still another example of use of a transfer apparatus, a transfer base, and a temperature management apparatus according to the sixth embodiment of the present invention.
Figure 26:
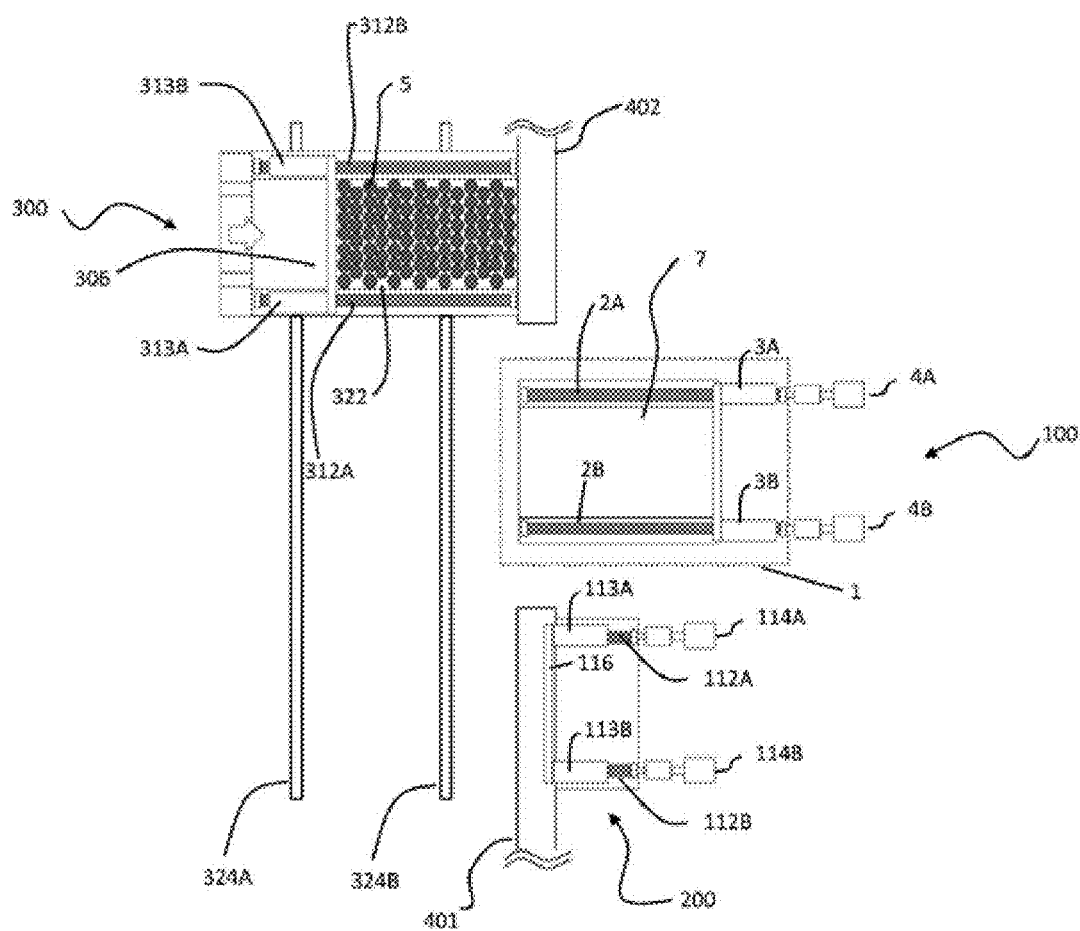
FIG. 26 is a schematic diagram illustrating still another example of use of a transfer apparatus, a transfer base, and a temperature management apparatus according to the sixth embodiment of the present invention.
Figure 27:
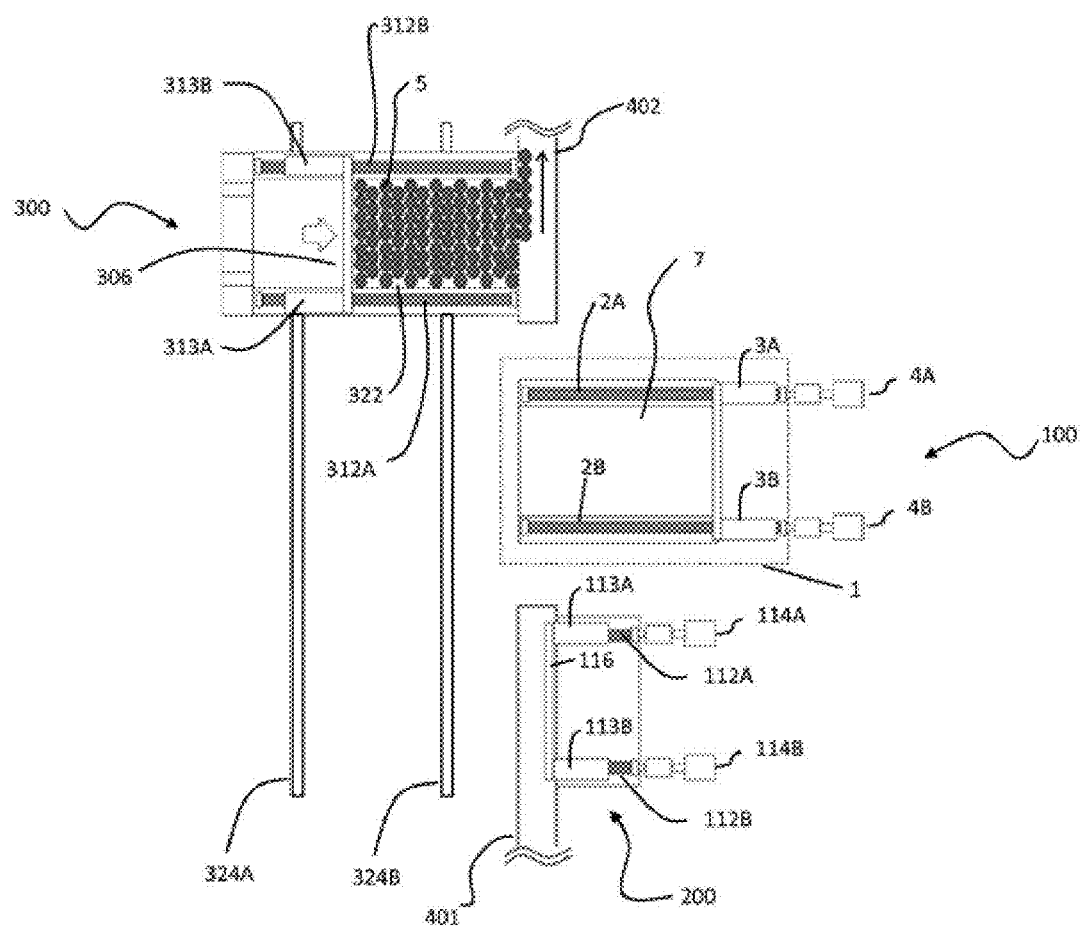
FIG. 27 is a schematic diagram illustrating still another example of use of a transfer apparatus, a transfer base, and a temperature management apparatus according to the sixth embodiment of the present invention.
Figure 28:
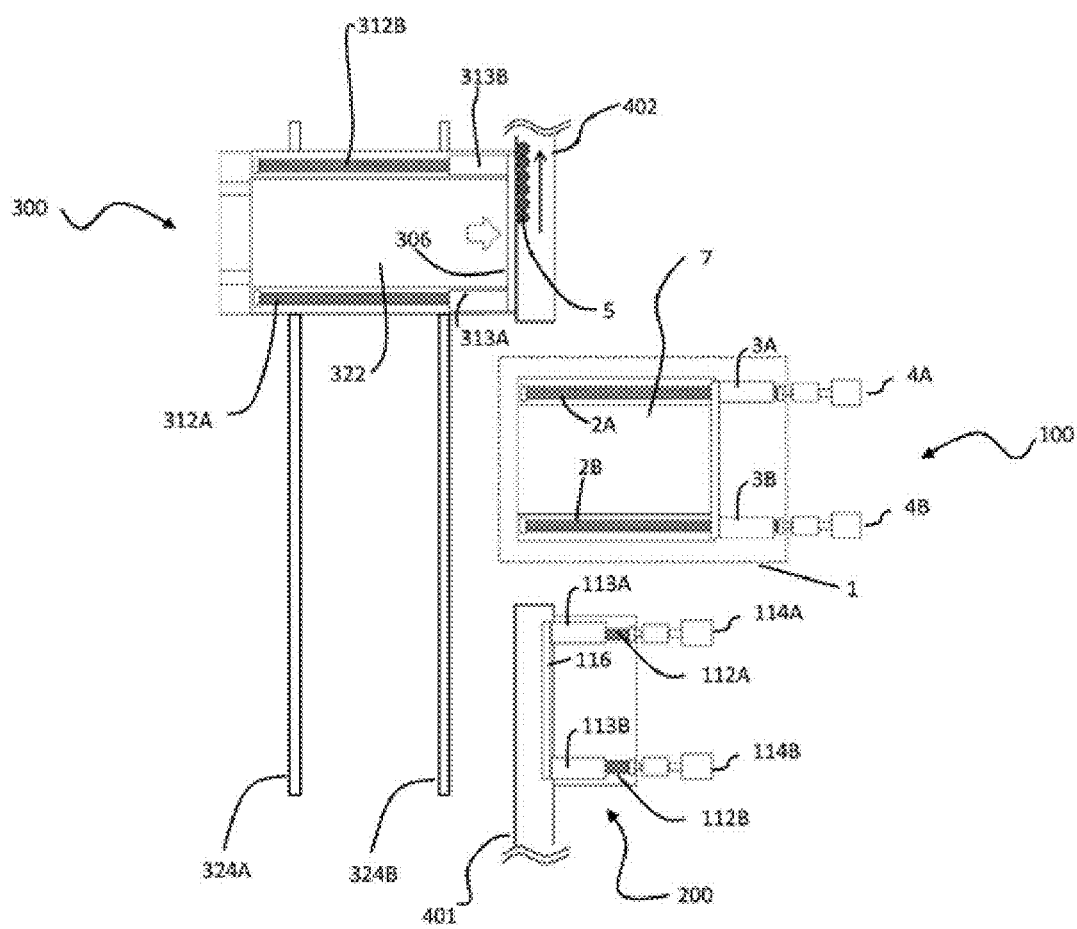
FIG. 28 is a schematic diagram illustrating still another example of use of a transfer apparatus, a transfer base, and a temperature management apparatus according to the sixth embodiment of the present invention.
Figure 29:
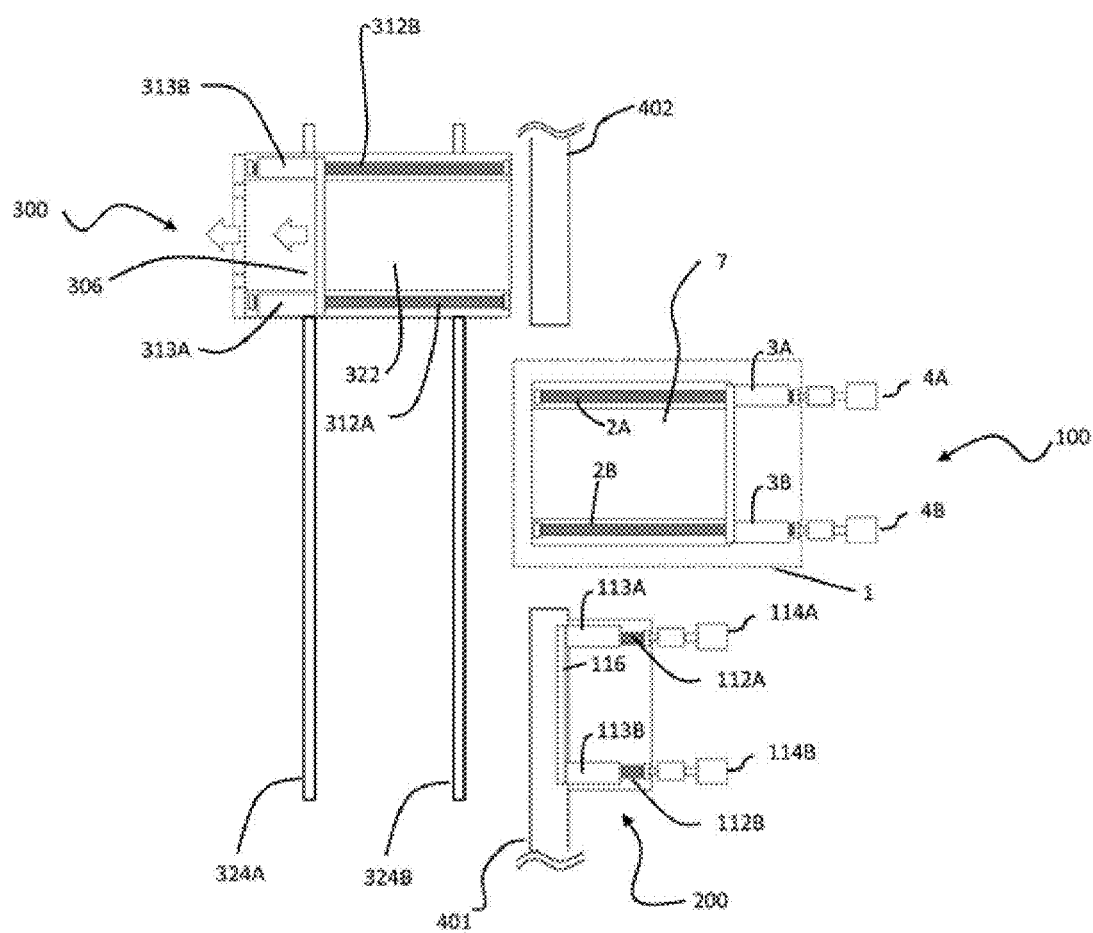
FIG. 29 is a schematic diagram illustrating still another example of use of a transfer apparatus, a transfer base, and a temperature management apparatus according to the sixth embodiment of the present invention.

As illustrated in FIG. 25, the transfer base 300 moves on the floor rails 324A and 324B up to a position to face the belt conveyor 402. Thereafter, as illustrated in FIG. 26, the transfer base 300 brings the table 322 close to the belt conveyor 402. Further, as illustrated in FIGS. 27 and 28, the contact member driving device of the transfer base 300 pushes out the articles 5 on the table 322 onto the belt conveyor 402 by the aid of the contact member 306. After having pushed out all of the articles 5 onto the belt conveyor 402, the transfer base 300 separates the table 322 from the belt conveyor 402, as illustrated in FIG. 29. Further, the transfer base 300 allows the contact member 306 to move in the direction opposite to the belt conveyor 402.

The temperature management apparatus 100 described in the first embodiment, the transfer apparatus 200 described in the third embodiment, and the transfer base 300 described in the fifth embodiment are combined together to thereby make it possible to transfer the articles 5 inside and outside the temperature management furnace 1, while the inside of the temperature management furnace 1 is kept clean and the temperature unevenness inside of the temperature management furnace 1 is suppressed. It should be noted that the same advantages are obtained even if the temperature management apparatus described in the second embodiment may be used, the transfer apparatus described in the fourth embodiment may be used, or the transfer base described in the modifications of the fifth embodiment is used.

Other Embodiments

As described above, the present invention has been described by way of the embodiments, but it should be understood that the description and the drawings constituting a part of the present disclosure do not limit the present invention. From the present disclosure, it will be apparent to those skilled in the art that various alternative embodiments, examples and operational techniques should be clarified. For example, the articles transferred inside and outside the temperature management furnace are not limited to the inclusion of medicines, but may include foods, beverages, precision parts, etc., as well as any articles to be controlled in temperature. The temperature management furnace of the temperature management apparatus is not limited to the freeze drying furnace, but may be a fermentation furnace, or includes any furnace in which it is desirable to suppress the internal temperature distribution unevenness and to suppress the dust generation. Further, the shape of the opposite member is not limited to the nut shape, but may be, for example, a concave shape. In that case, the rod-shaped member passes through a concave portion of a concave opposite member. S pole magnetized zones and N pole magnetized zones are alternately provided on a concave portion side surface of the concave opposite member. As described above, it should be understood that the present invention encompasses various embodiments and the like not described in the present disclosure.

LIST OF REFERENCE SIGNS

1: temperature management furnace
2A, 2B, 102A, 102B, 112A, 112B, 122A, 122B: rod-shaped member
3A, 3B, 103A, 103B, 113A, 113B, 123A, 123B: opposite member
4A, 4B, 104A, 104B, 124A, 124B: driving device
5: article
6, 106, 116, 126, 306: contact member
7: shelf board
11A, 11B, 121A, 121B: mandrel
12A, 12B: bearing
20A, 30A: pipe
31, 32: guide ring
40, 334A, 344A: shield
100: temperature management apparatus
114A, 114B: driving device
134A, 134B, 154A, 154B: belt
200: transfer apparatus
300: transfer base
302A: table movement rod-shaped member
303A: table movement opposite member
304A: table driving device
312A, 312B: contact member movement rod-shaped member
313A, 313B: contact member movement opposite member
314A: contact member driving device
321: base member
322: table
323A, 323B: wheel
324A, 324B: floor rail
325A: table movement rail
326A, 327A: guide
328: drive transmission member
401, 402: belt conveyor

The invention claimed is:

1. A temperature management apparatus comprising:
a temperature management furnace having an enclosure in which an article is placed and in which an internal temperature is managed;
a rod-shaped member that comprises a magnetic material;
a pipe in which the rod-shaped member is inserted;
an opposite member that is opposed to a part of a side surface of the rod-shaped member and comprises a magnetic material;
a driving device that rotates:
a) the pipe and the rod-shaped member, or
b) the opposite member,
around a central axis of the rod-shaped member to change a relative position between the rod-shaped member and the opposite member; and
a contact member that moves within the temperature management furnace in association with a change in the relative position between the rod-shaped member and the opposite member and that moves the article by contact with the article, wherein the driving device is disposed outside of the space whose temperature is managed.

2. The temperature management apparatus according to claim 1, wherein when the driving device rotates the rod-shaped member, the opposite member moves along the central axis of the rod-shaped member and the contact member fixed to the opposite member moves.

3. The temperature management apparatus according to claim 2, wherein the rod-shaped member, the opposite member, and the contact member are disposed inside of the enclosure.

4. The temperature management apparatus according to claim 3, further comprising a mandrel that penetrates a side wall of the temperature management furnace and connects the rod-shaped member to the driving device.

5. The temperature management apparatus according to claim 4, further comprising a sealing member that is disposed in a hole in the side wall of the temperature management furnace through which the mandrel penetrates.

6. The temperature management apparatus according to claim 1, wherein when the driving device rotates the opposite member, the rod-shaped member moves in a direction of the central axis and the contact member fixed to the rod-shaped member moves.

7. The temperature management apparatus according to claim 6, wherein the contact member is disposed inside of the space whose temperature is managed, and the opposite member is disposed outside of the enclosure.

8. The temperature management apparatus according to claim 7, wherein the rod-shaped member penetrates through the side wall of the temperature management furnace.

9. The temperature management apparatus according to claim 8, further comprising a sealing member that is disposed in a hole in the side wall of the temperature management furnace through which the rod-shaped member penetrates.

10. The temperature management apparatus according to claim 1, wherein one or more of the rod-shaped member and the opposite member comprises a respective plurality of magnetized zones of opposing polarity that are alternately provided on at least a respective portion of one or more of the side surface and an inner peripheral surface of the opposite member.

11. The temperature management apparatus according to claim 10, wherein the rod-shape member and the opposite member each comprise the respective plurality of magnetized zones provided in respective spiral shapes having a same pitch.

12. The temperature management apparatus according to claim 10, wherein one of the rod-shaped member and the opposite member comprises a threaded magnetic material.

13. A transfer apparatus comprising:
a rod-shaped member that comprises a magnetic material;
a pipe in which the rod-shaped member is inserted;
an opposite member that is opposed to a part of a side surface of the rod-shaped member and comprises a magnetic material;
a driving device that rotates:
a) the pipe and the rod-shaped member, or
b) the opposite member, around a central axis of the rod-shaped member to change a relative position between the rod-shaped member and the opposite member; and a contact member that moves in association with a change in the relative position between the rod-shaped member and the opposite member and moves an article to be transferred inside and outside of a temperature management furnace by contact with the article.

14. The transfer apparatus according to claim 13, wherein the temperature management furnace comprises a freeze drying furnace.

15. The transfer apparatus according to claim 13, wherein one or more of the rod-shaped member and the opposite member comprises a respective plurality of magnetized zones of opposing polarity that are alternately provided on at least a respective portion of one or more of the side surface and an inner peripheral surface of the opposite member.

16. The transfer apparatus according to claim 15, wherein the rod-shape member and the opposite member each comprise the respective plurality of magnetized zones provided in respective spiral shapes having a same pitch.

17. The transfer apparatus according to claim 15, wherein one of the rod-shaped member and the opposite member comprises a threaded magnetic material.

18. A transfer base comprising:
a base member;
a table that is located on the base member;
a table movement rod-shaped member that comprises a magnetic material;
a first pipe in which the table movement rod-shaped member is inserted;
a table movement opposite member that is opposed to a part of a side surface of the table movement rod-shaped member and comprises a magnetic material;
a table driving device that rotates:
  a) the first pipe and the table movement rod-shaped member, or
  b) the table movement opposite member,
  around a central axis of the table movement rod-shaped member and changes a relative position between the table movement rod-shaped member and the table movement opposite member to move the table;
a contact member for moving, by contact, an article placed on the table;
a contact member movement rod-shaped member that comprises a magnetic material;
a second pipe in which the contact member movement rod-shaped member is inserted;
a contact member movement opposite member that is opposed to a part of a side surface of the contact member movement rod-shaped member and comprises a magnetic material; and
a contact member driving device that rotates:
  a) the second pipe and the contact member movement rod-shaped member, or
  b) the contact member movement opposite member around a central axis of the contact member movement rod-shaped member and changes a relative position between the contact member movement rod-shaped member and the contact member movement opposite member to move the contact member.

19. The transfer base according to claim 18, wherein when the table driving device rotates the table movement rod-shaped member, the table movement opposite member moves along the central axis of the table movement rod-shaped member and the table fixed to the table movement opposite member moves.

20. The transfer base according to claim 18, wherein when the table driving device rotates the table movement opposite member, the table movement rod-shaped member moves in a direction of the central axis and the table fixed to the table movement rod-shaped member moves.

* * * * *